United States Patent
Watanabe et al.

(10) Patent No.: US 7,440,362 B2
(45) Date of Patent: Oct. 21, 2008

(54) OPTICAL DISC DRIVE WHICH USES A TRAIN OF PULSES TO SHIFT THE FOCUS OF A FOCUSING SECTION

(75) Inventors: Katsuya Watanabe, Nara (JP); Shin-ichi Yamada, Katano (JP); Kenji Fujiune, Takatsuki (JP); Yuuichi Kuze, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 570 days.

(21) Appl. No.: 10/722,875

(22) Filed: Nov. 26, 2003

(65) Prior Publication Data

US 2004/0105358 A1     Jun. 3, 2004

(30) Foreign Application Priority Data

Nov. 26, 2002   (JP)   ............................. 2002-342010

(51) Int. Cl.
    *G11B 7/00*   (2006.01)
(52) U.S. Cl. ............... 369/44.27; 369/44.25; 369/94
(58) Field of Classification Search .............. 369/44.29, 369/53.43, 94, 44.27, 44.25
    See application file for complete search history.

(56) References Cited

U.S. PATENT DOCUMENTS

| | | | |
|---|---|---|---|
| 5,060,215 A | 10/1991 | Kawamura et al. | |
| 5,286,965 A | 2/1994 | Okada | |
| 5,623,464 A | 4/1997 | Tani | |
| 5,903,530 A | 5/1999 | Tateishi et al. | |
| 6,011,762 A | 1/2000 | Watanabe et al. | |
| 6,147,942 A * | 11/2000 | Abe et al. | 369/44.27 |
| 6,222,798 B1 | 4/2001 | Kimura et al. | |
| 6,246,646 B1 * | 6/2001 | Abe et al. | 369/44.27 |
| 6,298,019 B1 | 10/2001 | Watanabe et al. | |
| 6,370,093 B1 * | 4/2002 | Tada et al. | 369/44.25 |
| 6,442,111 B1 | 8/2002 | Takahashi et al. | |
| 6,584,048 B1 * | 6/2003 | Tateishi et al. | 369/44.28 |
| 6,628,576 B1 * | 9/2003 | Watanabe et al. | 369/30.17 |
| 6,775,208 B1 * | 8/2004 | Liu et al. | 369/44.28 |

(Continued)

FOREIGN PATENT DOCUMENTS

| | | |
|---|---|---|
| CN | 200310117966.5 | 3/2006 |
| JP | 60-129934 A | 7/1985 |
| JP | 05082067 A * | 4/1993 |

*Primary Examiner*—Thang V Tran
(74) *Attorney, Agent, or Firm*—Panitch Schwarze Belisario & Nadel LLP

(57) ABSTRACT

An optical disc drive includes: a light source; a focusing section; a focus shifting section for shifting the focal point of light by changing the position of the focusing section perpendicularly to a data storage layer of a given optical disc in accordance with a control signal; a light receiving section for receiving, at multiple areas, the light reflected from the data storage layer and generating light quantity signals; a signal generating section for generating a focus error signal based on the light quantity signals; and a control section for generating the control signal responsive to the focus error signal such that the focal point is transferred to a focus controllable range. The control section generates the control signal such that the focal point is decelerated at a first acceleration and then at a second acceleration. The absolute value of the second acceleration is smaller than that of the first acceleration.

13 Claims, 11 Drawing Sheets

U.S. PATENT DOCUMENTS 6,777,657 B2 * 8/2004 Nishio et al. ............. 369/44.25
7,145,842 B2 * 12/2006 Kobayashi ............... 369/44.11
2004/0202084 A1 * 10/2004 Manoh et al. ................. 369/94

* cited by examiner

OPTICAL DISC DRIVE WHICH USES A TRAIN OF PULSES TO SHIFT THE FOCUS OF A FOCUSING SECTION

BACKGROUND OF THE INVENTION

1. Field of the Invention

The present invention relates to a control technique of focusing a light beam on a data storage layer of a given optical disc.

2. Description of the Related Art

Various types of optical discs such as DVD-ROM, DVD-RAM, DVD-RW, DVD-R, DVD+RW and DVD+R are already known as storage media on which a huge amount of information can be stored at a high density. In addition, brand-new types of optical discs, including Blu-ray Disc (BD), are currently under research and development in order to further increase the maximum densities and capacities of the optical discs.

An optical disc drive is used to read and/or write data from/on any of those various optical discs by focusing a light beam on the data storage layer of the optical disc. In processing an optical disc in which multiple data storage layers are stacked one upon the other, the optical disc drive can shift the focal point of the light beam from one of the data storage layers to another. Such shift of the focal point is called an "interlayer jump" or a "focus jump".

For example, the optical disc drive disclosed in Japanese Laid-Open Publication No. 9-326123 (see paragraphs Nos. 0108 through 0118 and FIGS. 12 and 18) performs the focus jump in the following manner. Specifically, first, while performing no focus control operation (i.e., while putting the focus control operation on hold), the optical disc drive applies a pulse signal to an optical head. In response to the pulse signal applied, the optical head starts shifting the focal point. In this case, by controlling the pulse signal, the optical disc drive initially increases the shifting velocity of the focal point and then decreases it. Thereafter, by detecting the light beam that has been reflected from the optical disc, the optical disc drive determines whether the light beam is just in focus, or slightly out of focus, with the target data storage layer (i.e., whether the focal point has been formed right on the target data storage layer or just slightly passed it). The focus jump operation ends with this decision.

However, if an optical disc requires a high-precision focus control of the light beam, then the conventional optical disc drive might be unable to perform the focus jump operation thereon accurately. For example, a DVD, which should rotate at a velocity that is high enough to read and write data sufficiently fast, and a BD, on which data is stored even more densely than a DVD, require that the variations in the focal point fall within relatively narrow ranges. For that reason, the conventional optical disc drive might fail to control the focal point or perform the focus jump operation accurately enough.

What is worse, if the optical disc drive cannot perform the focus jump operation just as intended, the objective lens (i.e., the convergent lens) of the optical disc drive might come into contact with the optical disc unintentionally. For example, when a convergent lens with a numerical aperture (NA) of about 0.8 or more is used to write data on a BD or any other high-density optical disc, the distance between the optical disc and the convergent lens will be approximately 100 μm. In that case, while the focal point of the light beam is jumping from a relatively shallow data storage layer to a deeper one, a conventional low-precision optical disc drive could not prevent the convergent lens from contacting with the optical disc. As a result, the convergent lens and the optical disc both might get scratched in that case.

SUMMARY OF THE INVENTION

In order to overcome the problems described above, preferred embodiments of the present invention provide an optical disc drive that can perform the focus jump operation just as intended while substantially preventing the convergent lens thereof from coming into contact with the given optical disc.

An optical disc drive according to a preferred embodiment of the present invention preferably includes a light source, a focusing section, a focus shifting section, a light receiving section, a focus error signal generating section, and a control section. The focusing section preferably focuses light emitted from the light source. The focus shifting section preferably shifts the focal point by changing the position of the focusing section perpendicularly to a data storage layer of a given optical disc in accordance with a control signal. The light receiving section preferably receives, at multiple areas, the light reflected from the data storage layer and generates light quantity signals representing quantities of the light received at the respective areas. The focus error signal generating section preferably generates a focus error signal based on the light quantity signals. The control section preferably generates the control signal in response to the focus error signal such that the focal point of the light is transferred to a focus controllable range in which a focus control is able to be performed on the data storage layer. The control section preferably generates the control signal such that the focal point of the light being shifted toward the data storage layer is decelerated initially at a first acceleration and then at a second acceleration. The absolute value of the second acceleration is preferably smaller than that of the first acceleration.

In one preferred embodiment of the present invention, the control section may generate the control signal such that the focusing section is brought away from the optical disc and that the focal point stops shifting once entered the focus controllable range.

In an alternative preferred embodiment, the control section may generate the control signal such that the focusing section is brought toward the optical disc until the focal point of the light passes the focus controllable range and then brought away from the optical disc once the focal point has passed the focus controllable range.

In this particular preferred embodiment, the control section may generate the control signal such that until the focal point of the light passes the focus controllable range, the focal point being shifted is decelerated at the first acceleration and then at the second acceleration, and that once the focal point has passed the focus controllable range, the focal point stops shifting.

In still another preferred embodiment, the control section may generate the control signal such that the focal point of the light being shifted is decelerated at the first acceleration and then stops shifting once and that the focal point starts being shifted again in the same direction and then decelerated at the second acceleration.

In still another preferred embodiment, the optical disc may have a plurality of data storage layers, and the control section may generate the control signal such that the focal point of the light being shifted from one of the plurality of data storage layers, for which the focus control is performed, toward the data storage layer.

In yet another preferred embodiment, the focus shifting section may change the position of the focusing section in response to a train of pulses applied thereto, and the control signal generated by the control section may include a first type of pulses that increases the acceleration and a second type of pulses that decreases the acceleration.

In this particular preferred embodiment, the focus shifting section may change the position, acceleration and velocity of the focusing section according to the numbers, magnitudes and durations of the first and second types of pulses applied, and the control section may generate the control signal by adjusting the numbers, magnitudes and/or durations of the first and second types of pulses applied.

In yet another preferred embodiment, the control section may suspend the focus control on the data storage layer while generating the control signal.

In that case, the control section may start the focus control after having transferred the focal point to the focus controllable range.

A focal point shifting method according to a preferred embodiment of the present invention is a method for getting the focal point of light transferred to a focus controllable range by an optical disc drive. The optical disc drive preferably includes a light source, a focusing section, a focus shifting section, a light receiving section, and a focus error signal generating section. The focusing section preferably focuses the light emitted from the light source. The focus shifting section preferably shifts the focal point of the light by changing the position of the focusing section perpendicularly to a data storage layer of a given optical disc in accordance with a control signal. The light receiving section preferably receives, at multiple areas, the light reflected from the data storage layer and generates light quantity signals representing quantities of the light received at the respective areas. The focus error signal generating section preferably generates a focus error signal based on the light quantity signals. The method preferably includes the steps of: (a) generating a first control signal in response to the focus error signal and supplying the first control signal to the focus shifting section such that the focal point of the light being shifted toward the data storage layer is decelerated at a first acceleration; and (b) generating a second control signal and supplying the second control signal to the focus shifting section after the step (a) such that the focal point of the light is decelerated at a second acceleration and that the absolute value of the second acceleration is smaller than that of the first acceleration.

A processor according to a preferred embodiment of the present invention is preferably used in an optical disc drive for focus control purposes. The optical disc drive preferably includes a light source, a focusing section, a focus shifting section, a light receiving section, and a focus error signal generating section. The focusing section preferably focuses light emitted from the light source. The focus shifting section preferably shifts the focal point of the light by changing the position of the focusing section perpendicularly to a data storage layer of a given optical disc in accordance with a control signal. The light receiving section preferably receives, at multiple areas, the light reflected from the data storage layer and generates light quantity signals representing quantities of the light received at the respective areas. The focus error signal generating section preferably generates a focus error signal based on the light quantity signals. The processor preferably includes a first shifting control section and a second shifting control section. The first shifting control section preferably generates a control signal in response to the focus error signal and supplies the control signal to the focus shifting section such that the focal point of the light being shifted toward the data storage layer is decelerated at a first acceleration. The second shifting control section preferably generates another control signal and supplies the control signal to the focus shifting section such that the focal point of the light is decelerated at a second acceleration and that the absolute value of the second acceleration is smaller than that of the first acceleration.

A computer program according to a preferred embodiment of the present invention is preferably used with an optical disc drive. The optical disc drive preferably includes a light source, a focusing section, a focus shifting section, a light receiving section, a focus error signal generating section and a control section. The focusing section preferably focuses the light emitted from the light source. The focus shifting section preferably shifts the focal point of the light by changing the position of the focusing section perpendicularly to a data storage layer of a given optical disc in accordance with a control signal. The light receiving section preferably receives, at multiple areas, the light reflected from the data storage layer and generates light quantity signals representing quantities of the light received at the respective areas. The focus error signal generating section preferably generates a focus error signal based on the light quantity signals. The control section preferably generates the control signal in response to the focus error signal. The computer program product causes the optical disc drive to perform steps of: (a) generating a first control signal in response to the focus error signal and supplying the first control signal to the focus shifting section such that the focal point of the light being shifted toward the data storage layer is decelerated at a first acceleration; and (b) generating a second control signal and supplying the second control signal to the focus shifting section such that the focal point of the light is decelerated at a second acceleration and that the absolute value of the second acceleration is smaller than that of the first acceleration.

According to various preferred embodiments of the present invention, the focal point of light being shifted toward a target data storage layer is initially decelerated at a first acceleration and then at a second acceleration, thereby carrying out a focus jump to the target data storage layer. In this case, since the absolute value of the second acceleration is smaller than that of the first acceleration, the focal point of the light can be transferred to a focus controllable range just as intended without going too far beyond the target data storage layer. In addition, the focusing section such as a lens for determining the focal point of the light never goes too close to the disc, either. Thus, it is possible to substantially prevent the focusing section from coming into contact with the optical disc accidentally.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Before specific preferred embodiments of an optical disc drive according to the present invention are described in detail, an optical disc to be loaded into the optical disc drive will be described.

Figure 1A:
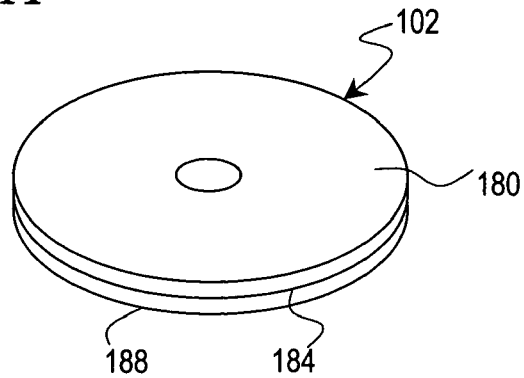
FIG. 1A is a perspective view illustrating the appearance of an optical disc 102.

FIG. 1A is a perspective view illustrating the appearance of an optical disc 102. The optical disc 102 is a disklike storage medium such as a BD on which data is recorded with a blue violet laser beam. Examples of other preferred optical discs 102 include CD, DVD-ROM, DVD-RAM, DVD-RW, DVD-R, DVD+RW and DVD+R. As shown in FIG. 1A, the optical disc 102 is formed by stacking at least one data storage layer 184 and a protective layer 188 on a substrate 180. That is to say, the substrate 180 supports the data storage layer 184 and the protective layer 188 thereon. The data storage layer 184 may be made of a phase change material to transmit and reflect the light received and store data thereon. A plurality of spiral tracks (not shown) may be provided on the data storage layer 184. In this case, each of those tracks may be defined as a land or a groove of the data storage layer 184. That is to say, the data may be written on these lands or grooves. The protective layer 188 is preferably made of a material that transmits a light beam and is provided to protect the data storage layer 184 from dust, scratches and so on.

Figure 1B:
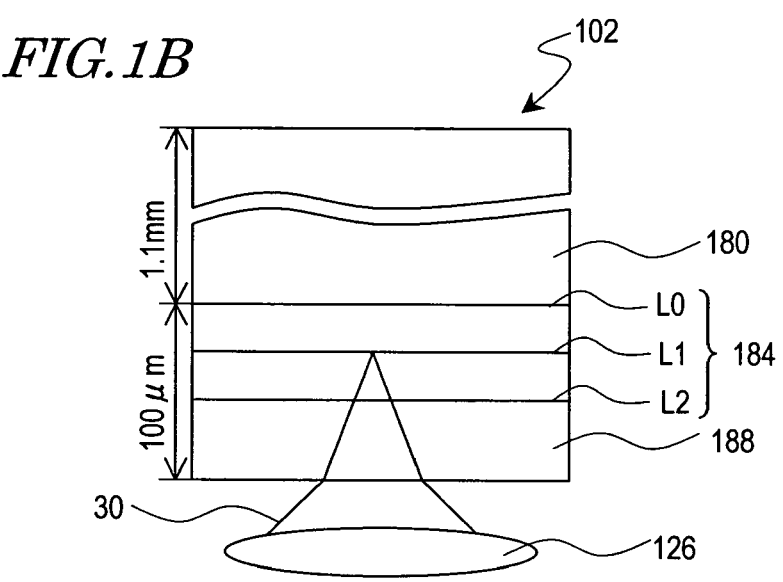
FIG. 1B is a cross-sectional view of an optical disc 102 including three data storage layers L0, L1 and L2.

FIG. 1B schematically illustrates a cross section of the optical disc 102 as taken perpendicularly to the principal surface and the data storage layers 184 of the optical disc 102. This optical disc 102 may have an overall thickness of about 1.2 mm. More specifically, the substrate 180 may have a thickness of about 1.1 mm and the data storage layers 184 and protective layer 188 may have a total thickness of about 0.1 mm (=100 µm). In the example illustrated in FIG. 1B, the optical disc 102 preferably includes three data storage layers L0, L1 and L2. Each adjacent pair of these layers L0, L1 and L2 is separated from each other by about 25 µm. That is to say, the deepest data storage layer L0 is located approximately 100 µm away from the surface of the protective layer 188. The intermediate data storage layer L1 is located approximately 75 µm away from the surface of the protective layer 188. The shallowest data storage layer L2 is located approximately 50 µm away from the surface of the protective layer 188.

The optical disc drive to be described later preferably reads or writes data from/on the optical disc 102 by irradiating the optical disc 102 with a light beam 30 such as a laser beam. In the example illustrated in FIG. 1B, the light beam 30 is incident onto the surface of the protective layer 188 so as to be focused on the intermediate data storage layer L1 for reference purposes.

Figure 1C:
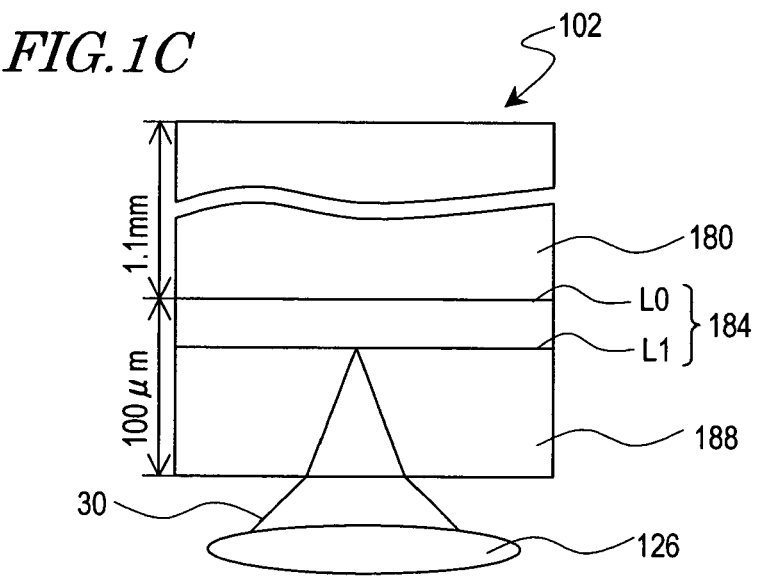
FIG. 1C is a cross-sectional view of an optical disc 102 including two data storage layers L0 and L1.

The optical disc 102 may naturally have a different number of data storage layers depending on the storage capacity required. For example, FIG. 1C illustrates an optical disc 102 with just two data storage layers L0 and L1. Even though the number of data storage layers included is different, the thickness of the substrate 180 of the optical disc 102 and the total thickness of the data storage layers 184 and protective layer 188 may be the same as the example illustrated in FIG. 1B. In the example illustrated in FIG. 1C, the light beam 30 is also incident onto the surface of the protective layer 188 so as to be focused on the data storage layer L1 for reference purposes. Optionally, the optical disc 102 may include four or more data storage layers.

In the following description, the optical disc 102 shown in FIG. 1B, including the three data storage layers L0, L1 and L2, is supposed to be loaded into the optical disc drive. Also, before starting the processing of the present invention to be described below, the optical disc drive is supposed to have already known how many data storage layers are included in the given optical disc and exactly where the focal point of the light beam is currently located.

Also, in the following description, the "focal point" of a light beam does not necessarily mean a point at which a light beam has been converged but may also refer to a portion of the light beam in a predetermined converging state. The "predetermined converging state" refers herein to a state of the light beam converged to such a degree as to allow the optical disc drive to perform its normal operations including tracking control, data reading and data writing. The converging state is obtained via focus control operation of the optical disc drive. This converging state is changeable with the type of the given optical disc 102 or the width of the tracks on the data storage layer 184. Also, when the focal point of the light beam is located right on the target data storage layer, the converged light beam may define a circular or elliptical beam spot on the data storage layer.

Embodiment 1

Figure 2:
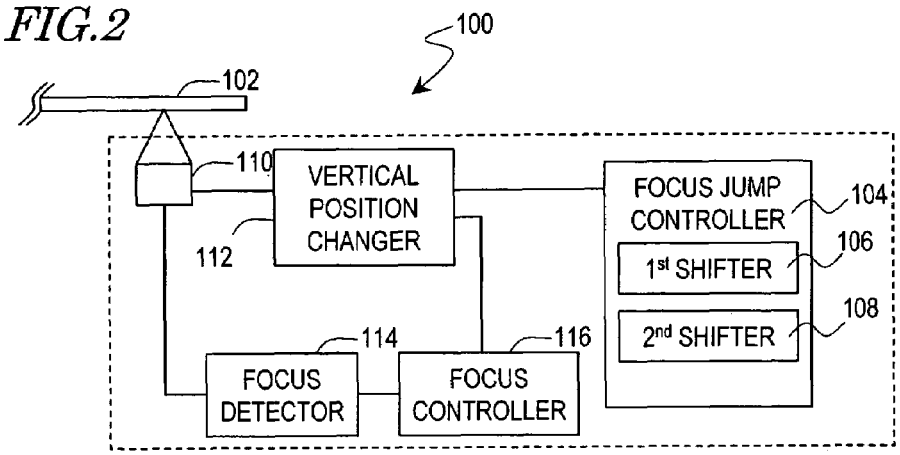
FIG. 2 is a block diagram showing an exemplary functional block arrangement for an optical disc drive 100 according to a first specific preferred embodiment of the present invention.

FIG. 2 shows an exemplary functional block arrangement for an optical disc drive 100 according to a first specific preferred embodiment of the present invention. As shown in FIG. 2, the optical disc drive 100 includes a focus jump controller 104, a focusing part 110, a vertical position changer 112, a focus detector 114 and a focus controller 116.

The focus jump controller 104 controls the operation of the optical disc drive 100 that is going to access a target location on the given optical disc 102. More specifically, the focus jump controller 104 preferably performs a control operation of shifting the focal point of a light beam from one of multiple data storage layers to another. Such shifting of the focal point is called an "interlayer jump" or a "focus jump". It should be noted that the "focus jump" refers herein to not only shifting the focal point of a light beam from one data storage layer to another but also shifting the focal point of a light beam from any position other than data storage layers onto a data storage layer. In the latter case, the present invention can be applied to either optical disc with one data storage layer or with a plurality of data storage layers. For the optical disc with a plurality of data storage layers, "focus jump" includes shifting the focal point of a light beam from any position other than data storage layers onto a data storage layer and further shifting the focal point to another data storage layer.

The focus jump controller 104 preferably includes a first shifter 106 and a second shifter 108. The first shifter 106 may perform a control operation of shifting the focal point of a light beam at a certain interval. The "interval" is defined perpendicularly to the data storage layers between the focal point and a target one of the data storage layers. For example, the first shifter 106 may output an acceleration signal, representing a preferred acceleration associated with a particular shifting direction, and supplies it as a control signal to the vertical position changer 112. In response to the acceleration signal, the vertical position changer 112 changes the position of the focusing part 110, thereby shifting the focal point of the light beam. After the first shifter 106 has shifted the focal point, the second shifter 108 generates another control signal to shift the focal point of the light beam at another interval, which is defined in the same direction as, but differently from, the interval described above.

In shifting the focal point of the light beam, each of the first and second shifters 106 and 108 also controls the shifting velocity of the focal point. For example, after the first shifter 106 has performed a control operation of shifting the focal point of a light beam from a data storage layer to the vicinity of a target data storage layer at a predetermined average velocity, the second shifter 108 may perform a control operation of accessing the target data storage layer at an average velocity that is low enough to substantially avoid an unwanted contact of the optical head or objective lens (or convergent lens) that emits the light beam with the given optical disc. The second shifter 108 may achieve such a low average velocity by repeatedly accelerating and decelerating the focal point shifting. More details (e.g., exactly how to change the velocities) about the focal point shifting processing will be described later.

It should be noted that the "velocity" is normally defined by speed and direction. The "positive" direction is defined herein as pointing from the protective layer 188 of the optical disc 102 to the data storage layers 184 thereof while the "negative" direction is defined herein as pointing from the data storage layers 184 to the protective layer 188. In other words, as viewed from the optical disc drive 100, the "positive" direction points toward the optical disc 102 while the "negative" direction points away from the optical disc 102.

The focusing part 110 is provided as a means for focusing the light beam on a target one of the data storage layers of the optical disc 102. The focusing part 110 may be a focusing system which includes a convergent lens, for example. Specifically, the focusing part 110 may include either an optical lens with an NA of about 0.6 or more or an optical lens with an NA of about 0.8 or more. The vertical position changer 112 moves the focusing part 110 substantially perpendicularly to the data storage layers. For example, the vertical position changer 112 may be a focus actuator as will be described later.

The focus detector 114 generates a signal representing the focusing state of the light beam on the data storage layer. In response to the signal supplied from the focus detector 114, the focus controller 116 drives the vertical position changer 112 to adjust the focal point of the light beam perpendicularly to the optical disc such that the light beam on the data storage layer keeps a substantially constant focusing state. This is a so-called "focus control operation". Also, the focus controller 116 may suspend the focus control operation before the focus jump is carried out and may start the focus control operation again after the focus jump has been carried out. The focus jump controller 104 preferably controls the focus jump operation by driving the vertical position changer 112.

Figure 3:
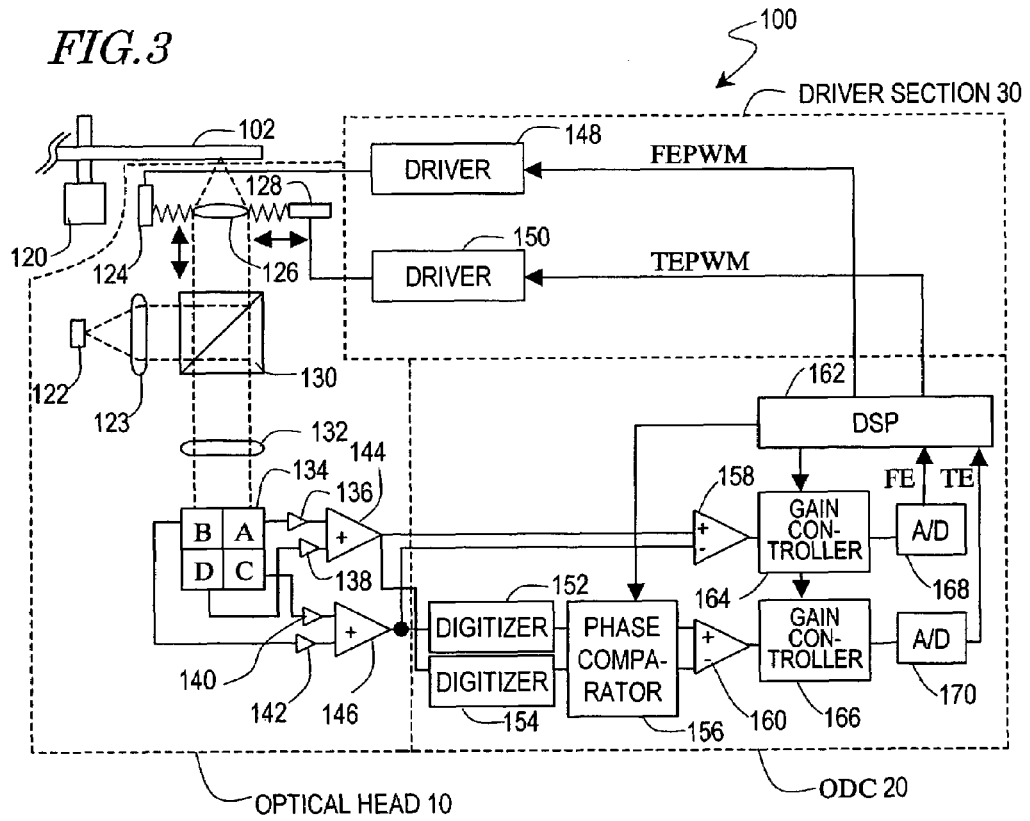
FIG. 3 shows an exemplary hardware configuration for the optical disc drive 100 shown in FIG. 2.

FIG. 3 shows an exemplary hardware configuration for the optical disc drive 100. As shown in FIG. 3, the optical disc drive 100 preferably includes an optical head 10, an optical disc controller (ODC) 20, a driver section 30 and a disc motor 120.

The optical head 10 is an optical system for use to focus a laser beam onto the data storage layer 184 of the optical disc 102 loaded. In response to a drive signal supplied from the driver section 30, the optical head 10 adjusts the optical system so as to receive the laser beam, which has been reflected from the optical disc 102, at a predetermined light receiving area and output a signal representing the quantity of the light that has been received at the light receiving area.

The ODC 20 controls the main operations of the optical disc drive 100. For example, responsive to the output signal of the optical head 10, the ODC 20 generates a control signal, thereby shifting the focal point of the light beam to the target data storage layer of the optical disc and performing focus control and tracking control operations. Also, the ODC 20 reads data from the optical disc 102, subjects the data to error correction and other types of processing, and then outputs it as a read signal.

In response to a control signal supplied from the ODC 20, the driver section 30 generates a drive signal and supplies it to the optical head 10.

The disc motor 120 rotates the optical disc 102 at a predetermined rpm.

Hereinafter, these components will be described in further detail one by one.

The optical head 10 includes a light source 122, a coupling lens 123, a focus actuator 124, a convergent lens 126, a tracking actuator 128, a polarization beam splitter 130, a condenser lens 132, a photodetector 134, preamplifiers 136, 138, 140 and 142, and adders 144 and 146.

The light source 122 for emitting a light beam may be implemented as a semiconductor laser diode, for example. In this case, the light beam emitted from the light source 122 may have either a wavelength of about 680 nm or less or a wavelength of about 410 nm or less. The coupling lens 123 collimates the light beam, emitted from the light source 122, into a parallel beam. The polarization beam splitter 130 reflects the parallel beam, which has gone through the coupling lens 123, toward the convergent lens 126.

The focus actuator 124 changes the position of the convergent lens 126 perpendicularly to the data storage layer of the optical disc 102. Then, the convergent lens 126 converges the parallel light beam, which has been reflected from the polarization beam splitter 130, thereby focusing it on the target data storage layer of the optical disc 102. As a result, a light beam spot is formed on the data storage layer.

Thereafter, the light is reflected from the optical disc 102, and then transmitted through the convergent lens 126 and the polarization beam splitter 130. The tracking actuator 128 changes the position of. the convergent lens 126 substantially parallel to the data storage layer of the optical disc 102.

The condenser lens 132 also transmits the light beam that has been reflected from the optical disc 102 and then transmitted through the convergent lens 126 and polarization beam splitter 130. On receiving the light beam that has just gone through the condenser lens 132, the photodetector 134 converts the quantity of the optical energy received into electric signals (e.g., current signals). The photodetector 134 may include four divided light-receiving areas, for example.

The preamplifiers 136, 138, 140 and 142 convert the output current signals of the photodetector 134 into voltage signals. Each of the adders 144 and 146 adds together the output voltage signals of its associated two preamplifiers 136 and 138 or 140 and 142, thereby obtaining two diagonal sums of the light-receiving areas of the photodetector 134.

The ODC 20 includes digitizers 152 and 154, a phase comparator 156, differential amplifiers 158 and 160, a digital signal processor (DSP) 162, gain controllers 164 and 166, and analog-to-digital converters (ADCs) 168 and 170.

The digitizers 152 and 154 respectively receive and digitize the output signals of the adders 144 and 146 of the optical head 10. The phase comparator 156 compares the phases of the output signals of the digitizers 152 and 154 with each other.

The differential amplifier 158 receives the output signals of the adders 144 and 146, thereby outputting a focus error (FE) signal. The FE signal is used to perform a focus control operation such that the light beam on the data storage layer of the optical disc 102 can maintain a predetermined focusing state. The FE signal may be detected by any arbitrary method, e.g., an astigmatism method, a knife edge method or a spot sized detection (SSD) method. The circuit configuration of the differential amplifier 158 may be appropriately modified according to the detection method adopted.

On the other hand, the differential amplifier 160 receives the output signals of the phase comparator 156, thereby outputting a tracking error (TE) signal. The TE signal is used to perform a tracking control operation such that the light beam can follow intended tracks on the optical disc 102. The TE signal may be detected by any arbitrary method, e.g., a phase difference method, a push-pull method or a three-beam method. The circuit configuration of the differential amplifier 160 may also be appropriately modified according to the detection method adopted.

In response to the TE signal and other signals, the DSP 162 supplies a tracking control signal to a driver circuit 150. Also, in response to the FE signal and other signals, the DSP 162 supplies a focus control signal to another driver circuit 148. The operation of the DSP 162, which is one of the primary features of the present invention, will be described in detail later.

The gain controller 164 controls the amplitude (i.e., the gain) of the FE signal to a predetermined value. The ADC 168 converts the output signal of the gain controller 164 into a digital signal and then passes it to the DSP 162.

On the other hand, the gain controller 166 controls the amplitude (i.e., the gain) of the TE signal to a predetermined value. The ADC 170 converts the output signal of the gain controller 166 into a digital signal and then passes it to the DSP 162.

The driver section 30 includes the driver circuits 148 and 150. On receiving the focus control signal from the DSP 162, the driver circuit 148 supplies a drive signal associated with the focus control signal to the focus actuator 124, thereby driving the focus actuator 124. On the other hand, on receiving the tracking control signal from the DSP 162, the driver circuit 150 supplies a drive signal associated with the tracking control signal to the tracking actuator 128, thereby driving the tracking actuator 128.

The photodetector 134, preamplifiers 136, 138, 140 and 142, adders 144 and 146, differential amplifier 158, gain controller 164, ADC 168, DSP 162, driver circuit 148, and focus actuator 124 are components required for performing a focus control operation and carry out the focus control function.

Meanwhile, the photodetector 134, preamplifiers 136, 138, 140 and 142, adders 144 and 146, digitizers 152 and 154, phase comparator 156, differential amplifier 160, gain controller 166, ADC 170, DSP 162, driver circuit 150, and tracking actuator 128 are components required for performing a tracking control operation and carry out the tracking control function.

There is the following correspondence between the functional block arrangement of the optical disc drive 100 shown in FIG. 2 and the hardware configuration thereof shown in FIG. 3.

The DSP 162 may be implemented as a computer (e.g., a microprocessor) and may carry out the functions of the focus controller 116 and focus jump controller 104 shown in FIG. 2 by executing one or more computer programs. The convergent lens 126 corresponds to the focusing part 110 shown in FIG. 2. The photodetector 134, preamplifiers 136, 138, 140 and 142, adders 144 and 146 and differential amplifier 158 together make up the focus detector 114 shown in FIG. 2. The driver circuit 148 and focus actuator 124 perform the function of the vertical position changer 112 shown in FIG. 2. It should be noted that the focus jump controller 104 (200) and focus controller 116 may be implemented as hardware components either partially or fully.

Figure 4A:
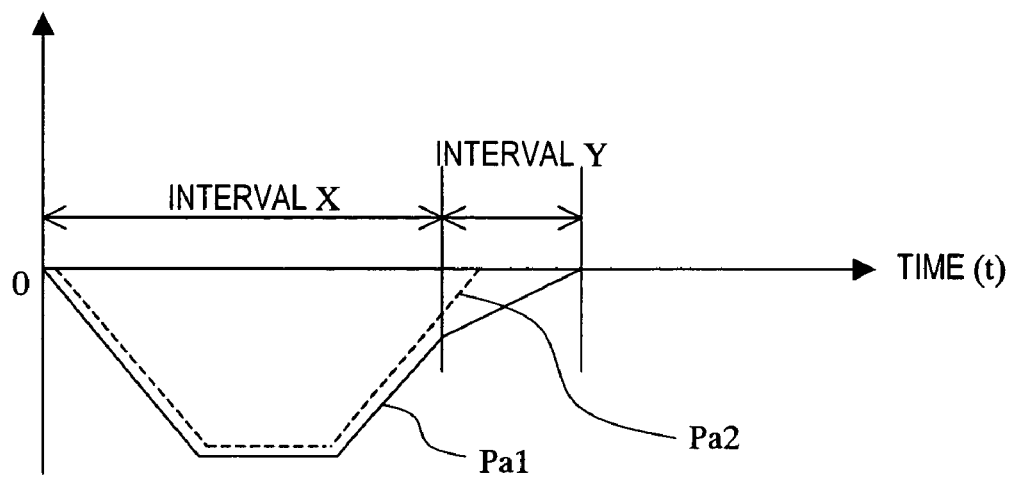
FIG. 4A shows velocities at which the focal point of a light beam is shifted back toward the incident plane of the optical disc 102.
Figure 4B:
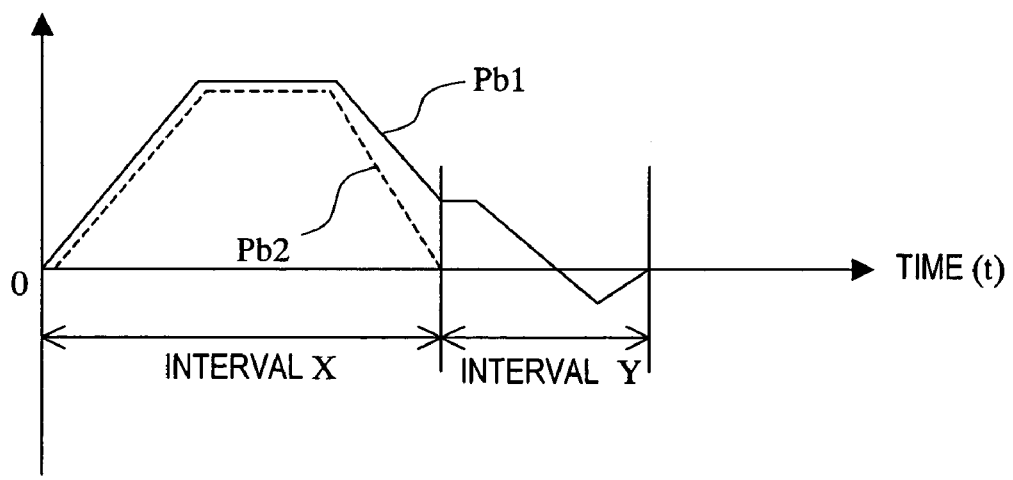
FIG. 4B shows velocities at which the focal point of a light beam is shifted deeper into the optical disc 102.

Next, it will be described how the optical disc drive 100 of this preferred embodiment performs the focus jump operation of shifting the focal point of the light beam from one of multiple data storage layers to another. The optical disc drive 100 may change the type of its control operation according to the direction in which the focal point of the light beam should be shifted. Hereinafter, it will be described with reference to FIGS. 4A and 4B how the focus shifting velocity of the light beam should be changed in a specific preferred embodiment of the present invention. In FIGS. 4A and 4B, the focus shifting velocity is supposed to be positive when the focal point is shifted into the depth of the optical disc 102, and negative when the focal point is shifted back toward the incident plane of the optical disc 102.

First, it will be described how to perform the focus jump operation when the focal point of the light beam is currently located deeper than the target data storage layer as viewed from the optical disc drive 100. In that case, the convergent lens 126 is brought away from the optical disc 102, thereby shifting the focal point of the light beam to the shallower data storage layer. FIG. 4A shows the shifting velocity profiles of the focal point of the light. beam in a situation where the focal point is shifted from the deeper data storage layer of the optical disc 102 to a shallower one. In FIG. 4A, the profile Pa1 represents how the focus shifting velocity should be changed by the optical disc drive 100 of this preferred embodiment, while the profile Pa2 represents how the focus shifting velocity is normally changed by the conventional optical disc drive for reference purposes.

As shown in FIG. 4A, the optical disc drive 100 controls the focus shifting velocity differently for the two intervals X and Y. Specifically, the focus shifting velocity of the light beam is preferably controlled in the following manner. First, in the interval X, the focal point of the light beam is shifted back toward the incident plane of the optical disc 102 (i.e., in the negative direction) initially at an increasing velocity, next at a constant velocity, and then at a decreased velocity. Thereafter, in the next interval Y, the focus shifting velocity is further decreased so as to be equal to zero when the focal point reaches the target data storage layer. The absolute value of the acceleration as represented by the gradient of the graph shown in FIG. 4A is smaller in the decelerating interval Y than in the decelerating portion of the interval X. Also, the average focus shifting velocity is lower in the interval Y than in the interval X. It should be noted that the average velocity is obtained by dividing the distance over which the focal point has shifted (which will be referred to herein as a "shift distance") by the time it has taken for the focal point to reach its destination. The shift distance corresponds to the area of the graph shown in FIG. 4A.

Next, it will be described how to perform the focus jump operation when the focal point of the light beam is currently located shallower than the target data storage layer as viewed from the optical disc drive 100. In that case, the convergent lens 126 is brought toward the optical disc 102, thereby shifting the focal point of the light beam to the deeper data storage layer. FIG. 4B shows the shifting velocity profiles of the focal point of the light beam in a situation where the focal point is shifted deeper into the optical disc 102. In FIG. 4B, the profile Pb1 represents how the focus shifting velocity should be changed by the optical disc drive 100 of this preferred embodiment, while the profile Pb2 represents how the focus shifting velocity is normally changed by the conventional optical disc drive for reference purposes.

Specifically, the focus shifting velocity of the light beam is preferably controlled in the following manner. First, in the interval X, the focal point of the light beam is shifted deeper into the optical disc 102 (i.e., in the positive direction) initially at an increasing velocity, next at a constant velocity, and then at a decreased velocity. Thereafter, in the next interval Y, the focus shifting velocity once becomes constant and then starts decreasing again. After having started to decrease, the shifting velocity changes from positive into zero, negative and zero again.

The focal point of the light beam shifts in the following manner according to its shifting velocity. First, in the intervals X and Y in which the shifting velocity decreases from a positive value to zero, the focal point of the light beam goes on shifting deeper into the optical disc 102 while decreasing its shifting velocity, passes the target data storage layer once, and then stops at a deeper position. Next, in a portion of the interval Y in which the shifting velocity further decreases from zero into a negative value, the focal point of the light beam starts to shift in the opposite direction (i.e., back toward the incident plane of the optical disc). Thereafter, the focal point of the light beam gradually decreases its shifting velocity and stops on reaching the. target data storage layer. In the example shown in FIG. 4B, the optical disc drive 100 also controls the focus shifting velocity differently for the two intervals X and Y. The average focus shifting velocity is also lower in the interval Y than in the interval X. Furthermore, the absolute value of the negative acceleration is smaller in the decelerating portion of the interval Y than in the decelerating portion of the interval X. Also, the absolute value of the positive acceleration in the accelerating portion of the interval Y in which the focus shifting velocity changes from its local minimum value to zero is preferably smaller than that of the positive acceleration in the accelerating portion of the interval X.

In each of the two focus jump operations shown in FIGS. 4A and 4B, the interval Y includes a portion in which the focus shifting velocity goes negative. Thus, the focal point is shifted back toward the incident plane of the optical disc 102 in that portion of the interval Y.

Hereinafter, (1) the focus jump operation of shifting the focal point of the light beam back toward the incident plane of the optical disc 102 and (2) the focus jump operation of shifting the focal point of the light beam deeper into the optical disc 102 will be described in further detail with reference to FIGS. 5 through 10.

FOCUS JUMP OPERATION TO SHIFT FOCAL POINT BACK TOWARD INCIDENT PLANE

In the following example, the focus jump operation is supposed to be carried out to shift the focal point from the vicinity of the deepest data storage layer L0 back to the shallowest data storage layer L2 (see FIG. 1B) to make the idea of the present invention more easily understandable.

Figure 5:
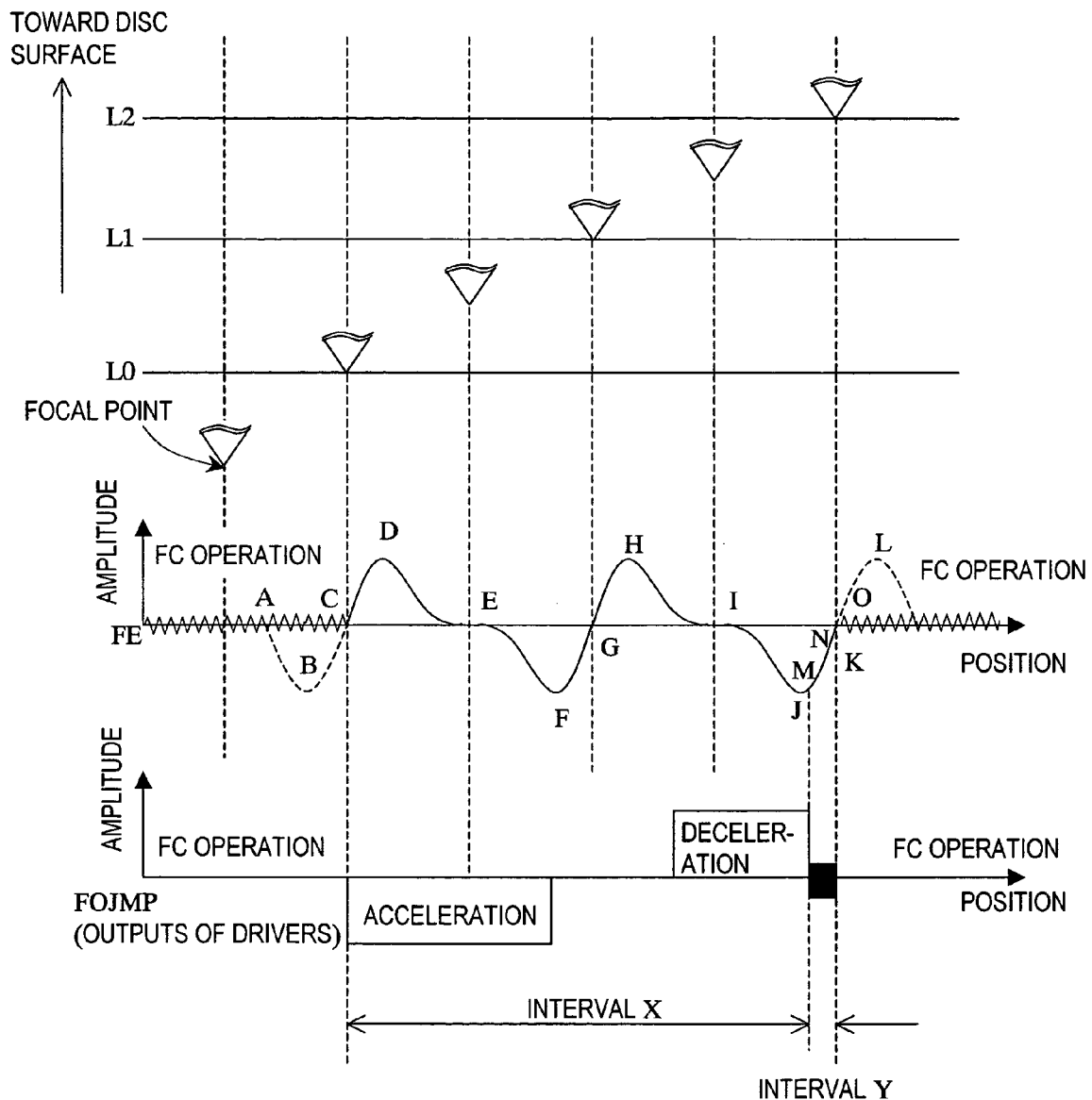
FIG. 5 shows a relationship between the control signals supplied in shifting the focal point from the data storage layer L0 to the data storage layer L2 and the focal point of the light beam.

FIG. 5 shows a relationship between the control signal supplied in shifting the focal point from the data storage layer L0 to the data storage layer L2 and the focal point of the light beam. As the focal point formed by the convergent lens 126 at point A is shifted back toward the incident plane and comes closer to the data storage layer L0, the quantity of light reflected from the data storage layer L0 increases. As a result, the FE signal with approximately zero amplitude increases its amplitude in the negative domain as shown by a dotted curve. The amplitude of the FE signal reaches its peak at point B, and then decreases. When the focal point reaches the data storage layer L0 (at point C), the amplitude of the FE signal becomes equal to zero. At this point, the optical disc drive 100 can perform focus control for the data storage layer L0, and then can perform the following procedure. Note that the FE signal up to the point C shown as a solid line represents a waveform in the case the disc drive 100 performs focus control for the data storage layer L0.

Next, as the focal point is shifted from the data storage layer L0 back toward the data storage layer L1, the FE signal with the approximately zero amplitude increases its amplitude in the positive domain. The amplitude of the FE signal reaches its peak at point D, gradually decreases, and then becomes equal to zero at point E. As the focal point comes even closer to the data storage layer L1, the quantity of light reflected from the data storage layer L1 increases. Thus, the FE signal with approximately zero amplitude increases its amplitude in the negative domain. The amplitude of the FE signal reaches its peak at point F, and then decreases. When the focal point reaches the data storage layer L1 (at point G), the amplitude of the FE signal becomes equal to zero.

Thereafter, as the focal point is shifted from the data storage layer L1 back toward the data storage layer L2, the FE signal with the approximately zero amplitude increases its amplitude in the positive domain. The amplitude of the FE signal reaches its peak at point H, decreases gradually and then becomes equal to zero at point I. As the focal point comes even closer to the data storage layer L2, the quantity of light reflected from the data storage layer L2 increases. Thus, the FE signal with approximately zero amplitude increases its amplitude in the negative domain. The FE signal reaches its local minimum at point J, and then increases. When the focal point reaches the data storage layer L2 (at point K), the amplitude of the FE signal becomes equal to zero. It should be noted that if the focal point is further shifted from the data storage layer L2 back toward the incident plane, the FE signal with approximately zero amplitude increases its amplitude in the positive domain, which reaches its peak at point L and then decreases. As shown in FIG. 5, as the focal point is shifted from the vicinity of the data storage layer L0 toward the data storage layer L2, the FE signal draws an S-curved waveform. Such a signal is termed an S-signal due to its waveshape.

Next, it will be described what control signals are generated to perform the focus jump operation described above. In shifting the focal point from the data storage layer L0 toward the data storage layer L2, the DSP 162 generates an acceleration signal and a deceleration signal as control signals. In response to the control signals, the driver circuit 148 drives the focus actuator 124, thereby shifting the focal point within the interval X. It should be noted that the "acceleration signal" applies a positive acceleration to (i.e., increases the acceleration of) the focal point being shifted, while the "deceleration signal" applies a negative acceleration to (i.e., decreases the acceleration of) the focal point being shifted.

As used herein, when the focal point is shifted back toward the incident plane of the optical disc 102, the focal point is shifted in the negative direction. Accordingly, in the following description, when the DSP 162 generates a negative signal, the focal point is shifted back toward the incident plane of the optical disc 102. On the other hand, when the DSP 162 generates a positive signal, the focal point is shifted deeper into the optical disc 102. Also, in the following description, as soon as the DSP 162 generates a signal, the signal is supplied to the driver circuit 148 and the driver circuit 148 immediately supplies a drive signal to the focus actuator 124 responsive to that signal. As a result, the position of the convergent lens 126 is changed by the focus actuator 124 and the focal point of the light beam is shifted.

First, suppose the DSP 162 is now performing a focus control operation such that the focal point is located right on the data storage layer L0. In that case, before starting a focus jump operation, the DSP 162 once puts the focus control operation on hold. Next, with the focus control operation still on hold, the DSP 162 generates a negative acceleration signal and applies it for a predetermined amount of time. In accordance with this acceleration signal, the focal point starts being shifted from the data storage layer L0 toward the data storage layer L2. The acceleration signal stops being generated and/or applied while the focal point is being shifted from the data storage layer L0 toward the data storage layer L1. Even so, the convergent lens 126 continues moving due to its inertia, and therefore, the focal point also keeps being shifted toward the data storage layer L2 at a substantially constant velocity.

Thereafter, the DSP 162 generates a deceleration signal, which stops being applied while the focal point is being shifted from the data storage layer L1 toward the data storage layer L2. When the deceleration signal stops being applied, the focus shifting velocity is not equal to zero but the focal point continues being shifted toward the data storage layer L2. That is to say, the DSP 162 adjusts the magnitude and duration of the deceleration signal such that the velocity produced by the acceleration signal does not become equal to zero.

A point M at which the DSP 162 stops applying the deceleration signal and which is close to the data storage layer L2 is located between points J and L, i.e., a range in which the focus control operation can be performed on the data storage layer L2. For example, the point H may be in the vicinity of the point J. The deceleration signal may be generated at any arbitrary point, which may be approximately a midpoint between the data storage layers L0 and L2, for instance. At the point M, the convergent lens 126 never comes into contact with the optical disc 102.

Figure 6:
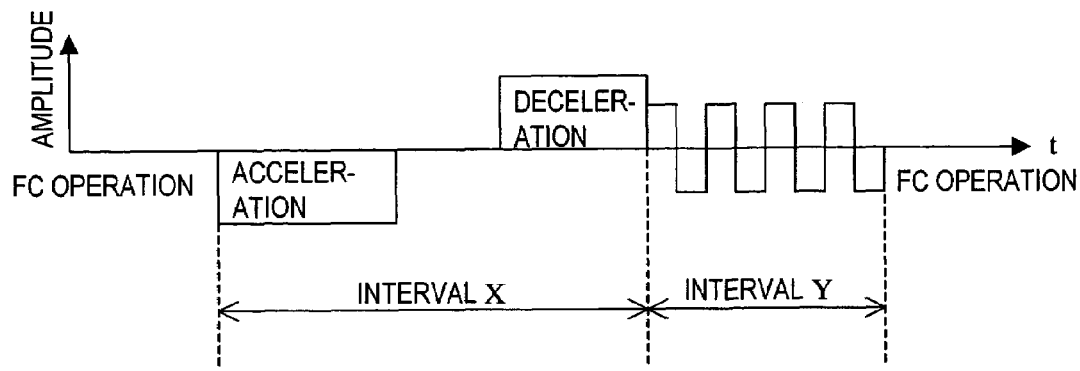
FIG. 6 shows the waveforms and timings of acceleration and deceleration signals to be applied in intervals X and Y.

Next, the DSP 162 performs a control operation for the interval Y (i.e., between the points M and K). Specifically, the DSP 162 generates a control signal and supplies it to the driver circuit 148 such that the focal point is shifted toward the data storage layer L2 at a lower average velocity than in the interval X. As shown in FIG. 6, this control signal is a pulse train including both positive acceleration pulses (which will be referred to herein as "accelerating pulses") and negative acceleration pulses (which will be referred to herein as "decelerating pulses"). That is to say, when the accelerating pulse is applied, the acceleration increases. On the other hand, when the decelerating pulse is applied, the acceleration decreases. FIG. 6 shows the waveforms and timings of acceleration and deceleration signals to be applied in intervals X and Y. In the pulse train shown in FIG. 6, positive pulses alternate with negative pulses with respect to a reference level. The DSP 162 may stop applying the pulse train when the focal point reaches the data storage layer L2 (i.e., at point K), when the focal point reaches point N which is close to, and ahead of, the data storage layer L2, or when the focal point reaches point 0 which is slightly beyond the data storage layer L2. In other words, the interval Y may range from point M to point K, from point M to point N, or from point M to point 0. After the focal point has passed the interval Y, the DSP 162 starts a focus control operation on the data storage layer L2. That is to say, the DSP 162 performs the focus jump operation by generating the acceleration and deceleration signals as described above.

Figure 7:
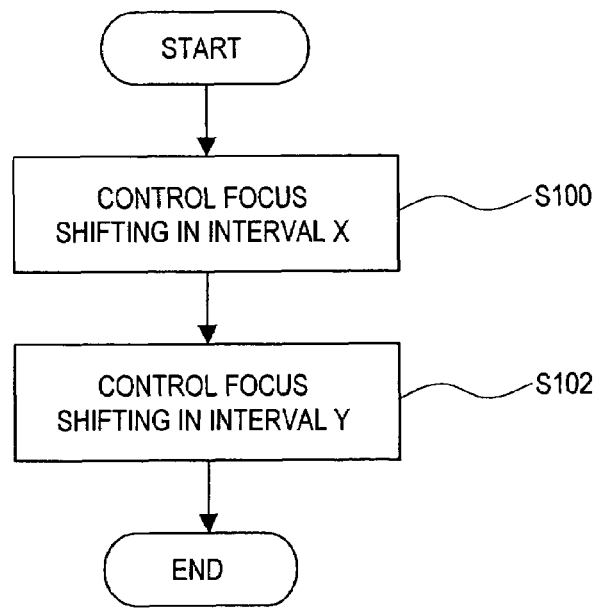
FIG. 7 is a flowchart showing a general procedure of a focus jump control operation according to the first preferred embodiment.

Next, it will be described with reference to FIGS. 7 and 8 exactly how the optical disc drive 100 performs the focus jump control operation of shifting the focal point back toward the incident plane of the optical disc 102. FIG. 7 shows a general procedure of the focus jump control operation of this preferred embodiment. In this focus jump control operation, first, in Step S100, the first shifter 106 of the focus jump controller 104 (see FIG. 2) controls the shift of the focal point in the interval X. Next, in Step S102, the second shifter 108 of the focus jump controller 104 (see FIG. 2) controls the shift of the focal point in the interval Y. This control operation will be described in further detail with reference to FIG. 8.

Figure 8:
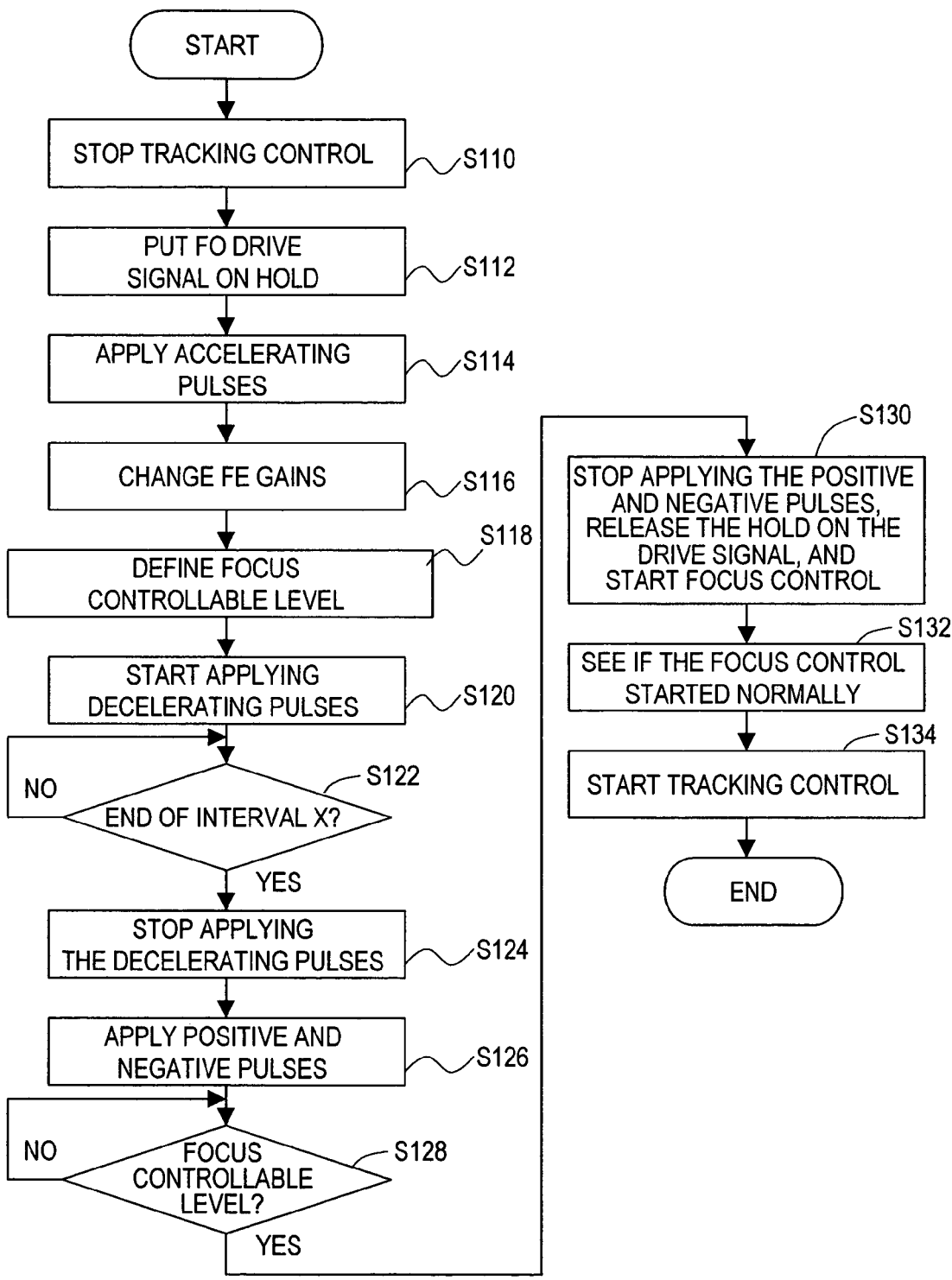
FIG. 8 is a flowchart showing a detailed procedure of the focus jump control operation of the first preferred embodiment.

FIG. 8 shows a detailed procedure of the focus jump control operation of the first preferred embodiment. The following processing steps are performed mainly by the DSP 162 that executes the functions of the first and second shifters 106 and 108.

First, the DSP 162 stops performing its tracking control operation in Step S110 and puts a focus control drive signal on hold in Step S112. Next, in Step S114, the DSP 162 generates an accelerating pulse train and applies it to the focus actuator 124 by way of the driver circuit 148. Subsequently, in Step S116, the DSP 162 changes the gain setting of the gain controller 164 to a value that is associated with the target data storage layer L2. Then, in Step S118, the DSP 162 defines a focus controllable level for the target data storage layer L2. In this manner, the S-signal and focus controllable level of the target data storage layer L2 can be detected accurately. It should be noted that the gain setting and focus controllable level are pre-defined for each data storage layer and stored on a nonvolatile memory (not shown), for example.

Next, in Step S120, the DSP 162 generates a decelerating pulse train and applies it to the focus actuator 124 by way of the driver circuit 148. Then, in Step S122, the DSP 162 determines whether or not the interval X has ended, i.e., whether or not the focal point has reached the point M, by monitoring the level of the FE signal of which the waveform is already known to the DSP 162. More specifically, the DSP 162 recognizes the first zero cross point of the FE signal changing from negative into positive as the point C and then recognizes the second zero cross point of the FE signal changing from negative into positive again as the point G. As a result, the DSP 162 can also recognize a position corresponding to a local minimum value as the point J after that. Alternatively, the DSP 162 may also sense the end of the interval X by any other signal such as the envelope of an AS or RF signal.

On deciding that the focal point has reached the point M, the DSP 162 stops applying the decelerating pulse train in Step S124, and instead starts applying a train of accelerating and decelerating pulses in Step S126.

Thereafter, in Step S128, the DSP 162 determines whether or not the level of the FE signal has reached the focus controllable level of the target data storage layer L2. If the answer is NO, then the procedure returns to the previous step S126. On the other hand, if the answer is YES, the procedure advances to the next step S130.

In that next step S130, the DSP 162 stops applying the accelerating and decelerating pulse train, releases the hold on the focus control drive signal, and starts the focus control operation. As a result, the focus control operation can be performed with good stability. Next, in Step S132, the DSP 162 sees, by the level of the TE or RF signal, for example, if the focus control operation has been started normally. Then, in Step S134, the DSP 162 starts the tracking control operation. Thereafter, the DSP 162 reads data by searching for a predetermined track or sector address.

It should be noted that the focus jump operation to be performed by bringing the convergent lens 126 away from the optical disc 102 includes not only the focus jump from the data storage layer L0 to the data storage layer L2 but also a focus jump from the data storage layer L0 to the data storage layer L1 and a focus jump from the data storage layer L1 to the data storage layer L2. Each of the latter two focus jump operations may be carried out just as described above.

FOCUS JUMP OPERATION TO SHIFT FOCAL POINT DEEPER INTO OPTICAL DISC 102

In the following example, the focus jump operation is supposed to be carried out to shift the focal point from the vicinity of the shallowest data storage layer L2 to the deepest data storage layer L0 (see FIG. 1B) to make the basic idea of the present invention more easily understandable.

Figure 9:
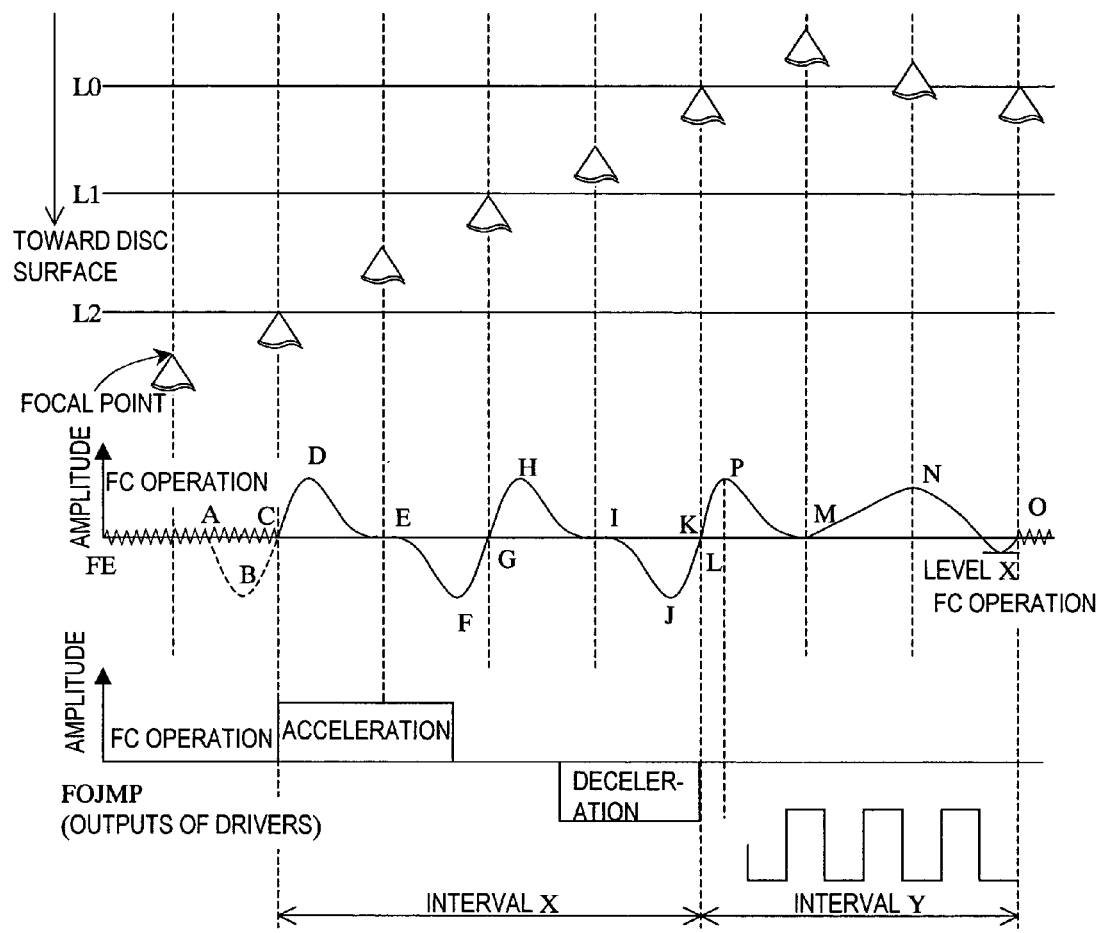
FIG. 9 shows a relationship between the control signals supplied in shifting the focal point from the data storage layer L2 to the data storage layer L0 and the focal point of the light beam.

FIG. 9 shows a relationship between the control signal supplied in shifting the focal point from the data storage layer L2 to the data storage layer L0 and the focal point of the light beam. As the focal point formed by the convergent lens 126 at point A is shifted deeper toward the data storage layer L2, the quantity of light reflected from the data storage layer L2 increases. As a result, the FE signal with approximately zero amplitude increases its amplitude in the negative domain. The amplitude of the FE signal reaches its peak at point B, and then decreases. When the focal point reaches the data storage layer L2 (at point C), the amplitude of the FE signal becomes equal to zero. At this point, the optical disc drive 100 can perform focus control for the data storage layer L2, and then can perform the following procedure. Note that the FE signal up to the point C shown as a solid line represents a waveform in the case the disc drive 100 performs focus control for the data storage layer L2.

Next, as the focal point is shifted from the data storage layer L2 deeper toward the data storage layer L1, the FE signal with the approximately zero amplitude increases its amplitude in the positive domain. The amplitude of the FE signal reaches its peak at point D, gradually decreases, and then becomes equal to zero at point E. As the focal point comes even closer to the data storage layer L1, the quantity of light reflected from the data storage layer L1 increases. Thus, the FE signal with approximately zero amplitude increases its amplitude in the negative domain. The amplitude of the FE signal reaches its peak at point F, and then decreases. When the focal point reaches the data storage layer L1 (at point G), the amplitude of the FE signal becomes equal to zero.

Thereafter, as the focal point is shifted from the data storage layer L1 deeper toward the data storage layer L0, the FE signal with the approximately zero amplitude increases its amplitude in the positive domain. The amplitude of the FE signal reaches its peak at point H, decreases gradually and then becomes equal to zero at point I. As the focal point comes even closer to the data storage layer L0, the quantity of light reflected from the data storage layer L0 increases. Thus, the FE signal with approximately zero amplitude increases its amplitude in the negative domain. The FE signal reaches its local minimum at point J, and then increases. When the focal point reaches the data storage layer L0 (at point K), the amplitude of the FE signal becomes equal to zero.

Next, the focal point goes beyond the data storage layer L0. As the focal point is further shifted even deeper than the data storage layer L0, the FE signal with the approximately zero amplitude increases its amplitude in the positive domain. The amplitude of the FE signal reaches its peak at point P, decreases gradually and then becomes equal to zero at point M, where the focal point starts being shifted in the opposite direction (i.e., back toward the incident plane of the optical disc 102). Then, the FE signal with the approximately zero amplitude increases its amplitude in the positive domain again. The amplitude of the FE signal reaches its peak at point N, decreases gradually and finally reaches a focus controllable level at point O. Then, the focus jump operation ends and a focus control operation starts instead.

The point M is the deepest position (i.e., most distant) from the incident plane of the optical disc 102. Accordingly, when the focal point reaches the point M, the convergent lens 126 is located closest to the optical disc 102. In the optical disc drive 100 of this preferred embodiment, however, the convergent lens 126 never comes into contact with the optical disc 102. This is because although the distance between the convergent lens 126 and the optical disc 102 is about 100 μm, the point M is only a few μm away from the data storage layer L0. Also, once the focal point has passed the point P corresponding to a peak of the amplitude, the shifting velocity of the focal point gradually decreases to reach zero at the point M. This is why the focal point never goes too far and nor does the point M change too much, either.

Next, it will be described what control signals are generated to perform the focus jump operation described above. In shifting the focal point from the data storage layer L2 toward the data storage layer L0, the DSP 162 applies an acceleration signal and a deceleration signal to the driver circuit 148, thereby shifting the focal point within the interval X. It should be noted that in shifting the focal point from the data storage layer L2 toward the data storage layer L0 within the interval X, the same control signals are used as in shifting the focal point from the data storage layer L0 toward the data storage layer L2 but the polarities of the acceleration and deceleration signals for use in this focus jump operation are opposite to those of the acceleration and deceleration signals for use in the focus jump operation described above. Thus, the control signal to be applied while the focal point is being shifted within the interval Y will be described.

When the focal point reaches the point K, the DSP 162 stops applying the deceleration signal and the optical disc drive 100 enters a standby state to generate no control signals. However, even when the deceleration signal is no longer applied, the convergent lens 126 continues moving for a while due to inertia force and the focal point also continues being shifted beyond the data storage layer L0 at a substantially constant velocity. As a result, the amplitude of the FE signal also increases in the positive domain and reaches its peak at the point P.

Thereafter, when the focal point passes the point P corresponding to that peak, the DSP 162 generates a decelerating pulse train to decrease the focus shifting velocity. As a result, the convergent lens 126 is accelerated in the opposite direction (i.e., back toward the incident plane of the optical disc 102) and the focal point decreases its shifting velocity. Then, the convergent lens 126 will stop moving before the FE signal crosses the zero level at the point M. However, the DSP 162 will keep on generating the decelerating pulse train even after that. Consequently, the focal point is shifted toward the data storage layer L0 again and the amplitude of the FE signal increases in the positive domain again. Subsequently, the amplitude of the FE signal reaches its peak at point N and then gradually decreases. The DSP 162 will still keep on generating the decelerating pulses until the level of the FE signal reaches the focus controllable level. After that, the DSP 162 will start a focus control operation on the data storage layer L0.

Once the amplitude of the FE signal crosses the zero level (at the point M) after having reached its peak (at the point P), it is normally impossible to perform a focus control operation on the data storage layer L0. However, if the focal point of the light beam is shifted in the opposite direction after that, then the FE signal will clearly reach another peak and then cross the zero level again. It is also clear that a predetermined range including that zero cross point is a focus controllable range. Consequently, even after the focal point has reached the point M where no focus control is normally available on the data storage layer L0, the optical disc drive 100 can still perform the focus control on the data storage layer L0 by shifting the focal point in the opposite direction and monitoring the level of the FE signal. It should be noted that to perform the focus control operation with even more certainty, the optical disc drive 100 stores the peak values of the FE signal and compares the peak value obtained by shifting the focal point in the opposite direction with an associated one of the stored peak values of the FE signal, thereby determining whether or not the focal point has been shifted back to the focus controllable range.

Next, it will be described exactly how the optical disc drive 100 performs the focus jump operation of shifting the focal point deeper into the optical disc 102. Its general procedure is also as shown in FIG. 7 and the description thereof will be omitted herein.

Figure 10:
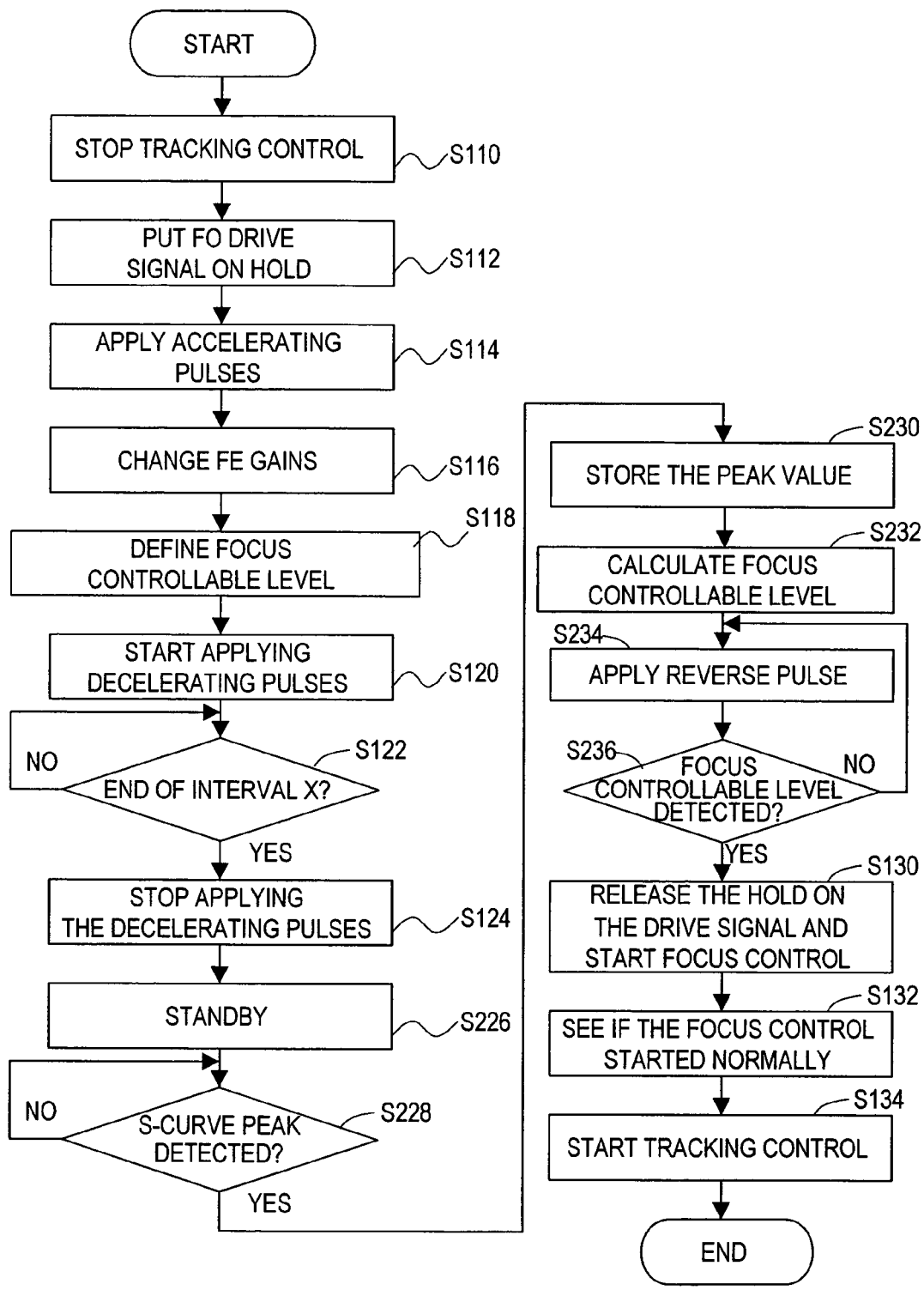
FIG. 10 is a flowchart showing a detailed procedure of another focus jump control operation according to the first preferred embodiment.

FIG. 10 shows a detailed procedure of the focus jump control operation of this preferred embodiment. In FIG. 10, the same processing step for the interval X as that also shown in FIG. 8 is identified by the same reference numeral and the description thereof will be omitted herein. Thus, the following description will be focused on the processing steps (from Step S226 on) to be carried out by the DSP 162 for the interval Y.

On finishing applying the decelerating pulses in Step S124, the DSP 162 enters a standby state in Step S226 to generate no control signals and will maintain its state for a certain period of time to detect the FE signal. This standby state lasts until the amplitude of the FE signal reaches the S-curve peak at the point P shown in FIG. 9. If the DSP 162 has detected the S-curve peak in the FE signal in Step S228, then the DSP 162 stores the peak value in Step S230, and then calculates the focus controllable level of the target data storage layer L0 in Step S232. Thereafter, in Step S234, the DSP 162 applies a reverse pulse to the driver circuit 148 such that the focal point is shifted back toward the data storage layer L0 until the focus controllable level is detected. It should be noted that once the DSP 162 has sensed the level of the FE signal reach one of the stored peak values, the DSP 162 regards the FE signal as having a focus controllable level in Step S236. Thereafter, the DSP 162 performs Steps S130, S132 and S134, which are the same as the counterparts shown in FIG. 8 and the description of which will be omitted herein.

It should be noted that the focus jump operation to be performed by bringing the convergent lens 126 toward the optical disc 102 includes not only the focus jump from the data storage layer L2 to the data storage layer L0 but also a focus jump from the data storage layer L2 to the data storage layer L1 and a focus jump from the data storage layer L1 to the data storage layer L0. Each of the latter two focus jump operations may be carried out just as described above.

In any of the focus jump operations (1) and (2) described above, the deceleration signal may start being applied at any time (i.e., no matter where the focal point is located). For example, the deceleration signal may start being applied when the focal point reaches approximately a midpoint between the data storage layers L0 and L2.

In the preferred embodiments described above, the focus jump operation is performed differently depending on whether the focal point should be shifted toward or away from the incident plane of the optical disc 102. However, these preferred embodiments of the present invention are nothing but illustrative ones. Alternatively, the optical disc drive 100 may always perform the focus jump operation as described in either (1) or (2).

Embodiment 2

Figure 11:
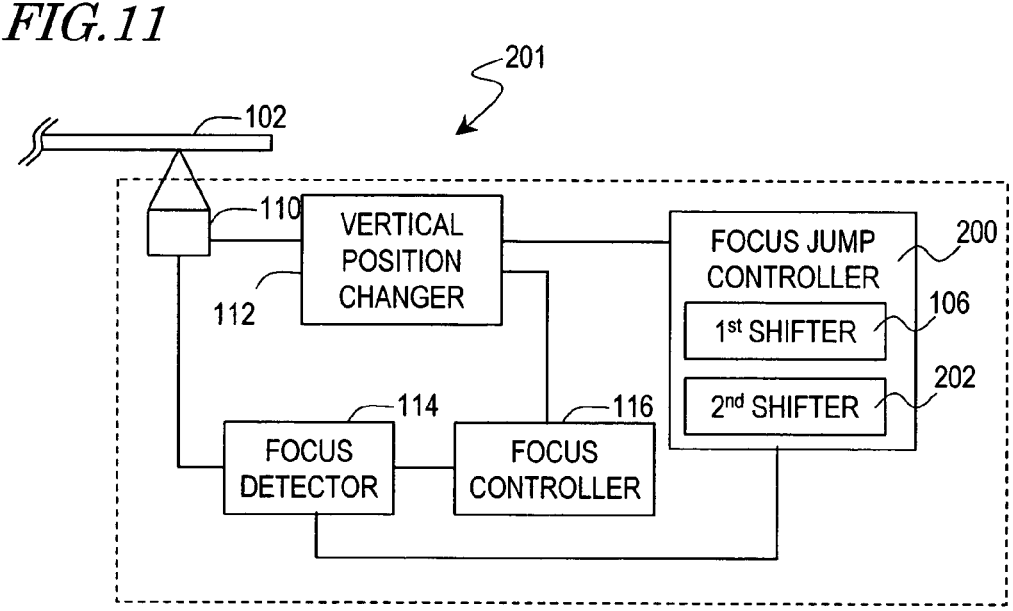
FIG. 11 is a block diagram showing an exemplary functional block arrangement for an optical disc drive 201 according to a second specific preferred embodiment of the present invention.

FIG. 11 shows an exemplary functional block arrangement for an optical disc drive 201 according to a second specific preferred embodiment of the present invention. As shown in FIG. 11, the optical disc drive 201 includes a focus jump controller 200, the focusing part 110, the vertical position changer 112, the focus detector 114 and the focus controller 116. In FIG. 11, each component having the same function as the counterpart of the optical disc drive 100 shown in FIG. 2 is identified by the same reference numeral and the description thereof will be omitted herein. The optical disc drive 201 may be used as a replacement for the optical disc drive 100 of the first preferred embodiment described above. Thus, the optical disc drive 201 of this second preferred embodiment may perform the same operation as the optical disc drive 100 of the first preferred embodiment described above. For example, the optical disc drive 201 may also perform the focus jump operation No. (1) or (2) of the first preferred embodiment. In that case, however, the optical disc drive 201 preferably performs some alternative or additional processing steps as will be described below.

Figure 12:
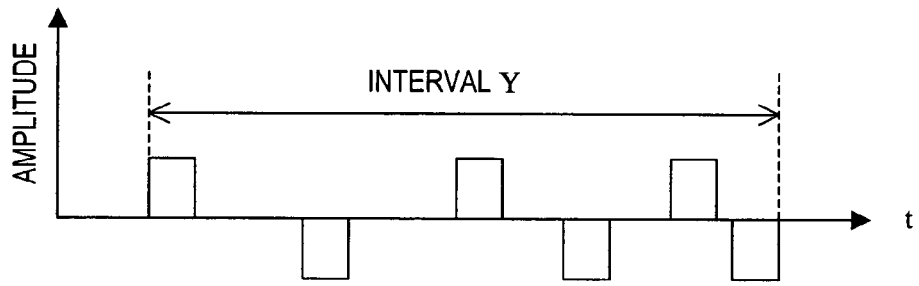
FIG. 12 shows a first exemplary control signal to be applied by a second shifter 202 in an interval Y.

The focus jump controller 200 preferably includes the first shifter 106 and a second shifter 202. The first shifter 106 operates just like the counterpart of the first preferred embodiment described above. On the other hand, the second shifter 202 controls the focus shifting velocity in accordance with a signal supplied from the focus detector 114. For example, the second shifter 202 may detect the distance between a target data storage layer and the focal point of the light beam by the level of the output signal of the focus detector 114. FIG. 12 shows a first exemplary control signal to be applied by the second shifter 202 in the interval Y. In response to the FE signal supplied from the focus detector 114, the second shifter 202 controls the number of pulses in the pulse train to be applied during the focus jump operation. In this case, the greater the number of pulses, the more precisely the focusing part 110 can be controlled. Thus, the second shifter 202 can change the pulse interval with the distance from the focal point to the target data storage layer. For example, as the focal point is getting closer to the target data storage layer, the second shifter 202 can narrow the pulse interval. Consequently, the focus jump control operation can be performed appropriately in the vicinity of the target data storage layer according to the distance between the focal point and the data storage layer.

Figure 13:
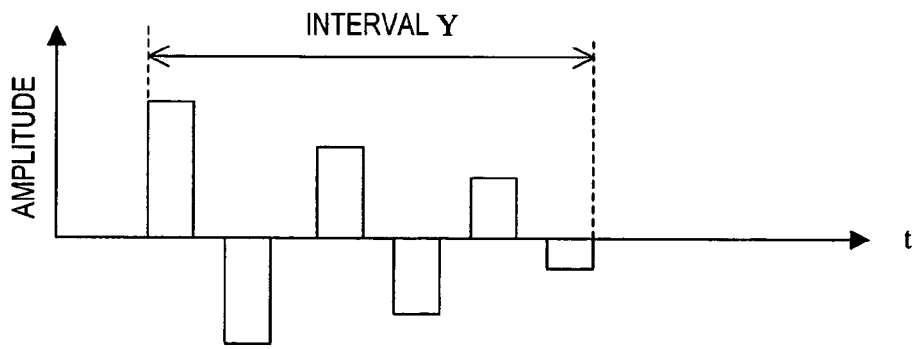
FIG. 13 shows a second exemplary control signal to be applied by the second shifter 202 in the interval Y.

FIG. 13 shows a second exemplary control signal to be applied by the second shifter 202 in the interval Y. As shown in FIG. 13, the second shifter 202. may also control the pulse heights of the pulse train in accordance with the signal supplied from the focus detector 114. As used herein, the "pulse height" means the magnitude of a signal pulse. For example, the greater the pulse height, the higher the acceleration of the focusing part 110. Stated otherwise, the smaller the pulse height, the lower the acceleration of the focusing part 110. Thus, the second shifter 202 can change the pulse height with the distance from the focal point of the light beam to the target data storage layer. For example, as the focal point is getting closer to the target data storage layer, the second shifter 202 can decrease the pulse height. Consequently, the focus jump control operation can be performed appropriately in the vicinity of the target data storage layer according to the distance between the focal point and the data storage layer.

Figure 14:
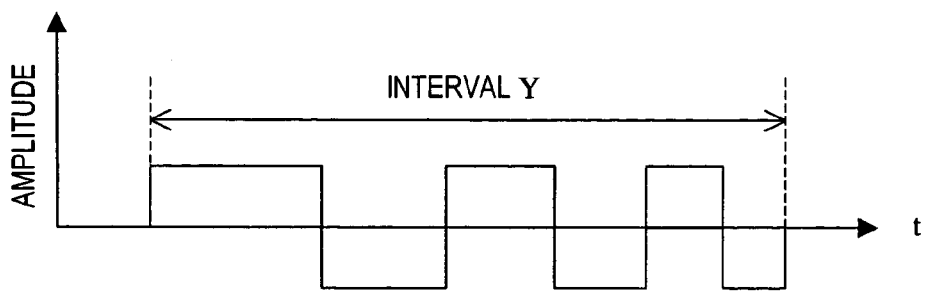
FIG. 14 shows a third exemplary control signal to be applied by the second shifter 202 in the interval Y.

FIG. 14 shows a third exemplary control signal to be applied by the second shifter 202 in the interval Y. As shown in FIG. 14, the second shifter 202 may also control the pulse widths of the pulse train in accordance with the signal supplied from the focus detector 114. As used herein, the "pulse width" means the duration of a signal pulse. For example, the broader the pulse width, the higher the rate of increase in the velocity of the focusing part 110. Stated otherwise, the narrower the pulse width, the lower the rate of increase in the velocity of the focusing part 110. Thus, the second shifter 202 can change the pulse width with the distance from the focal point of the light beam to the target data storage layer. For example, as the focal point is getting closer to the target data storage layer, the second shifter 202 can decrease the pulse width. Consequently, the focus jump control operation can be performed appropriately in the vicinity of the target data storage layer according to the distance between the focal point and the data storage layer.

Figure 15:
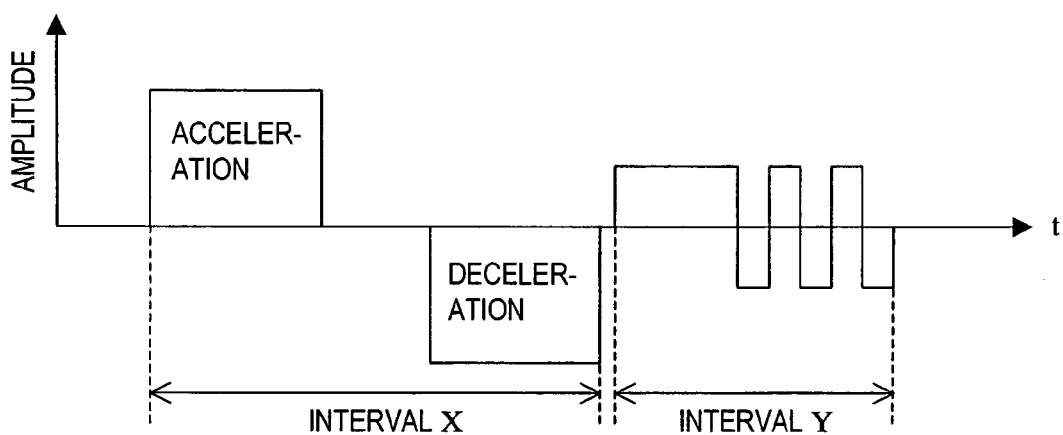
FIG. 15 shows an exemplary pair of control signals to be applied in intervals X and Y.

Next, other exemplary control signals to be used in any of the optical disc drives 100 and 201 of the first and second preferred embodiments will be described. FIG. 15 shows an exemplary pair of control signals to be applied in intervals X and Y. The first shifter 106 may control the focal point of the light beam such that the focal point once stops being shifted at the end of the interval X. Thus, the focusing part 110 (i.e., the convergent lens 126, for example) is even less likely to come into contact with the optical disc 102. In that case, the second shifter 108 or 202 generates decelerating pulses so as to not to cancel the accelerating pulses in the interval Y. In this manner, the focal point once stopped can start being shifted toward the target data storage layer again. After having started to be shifted, the focal point is gently slowed down until entering a focus controllable range. On entering the focus controllable range, the focal point is stopped. In this case, the magnitude of the acceleration just before the focal point stops shifting for the second time is preferably smaller than that of the acceleration just before the focal point stops shifting for the first time.

Figure 16:
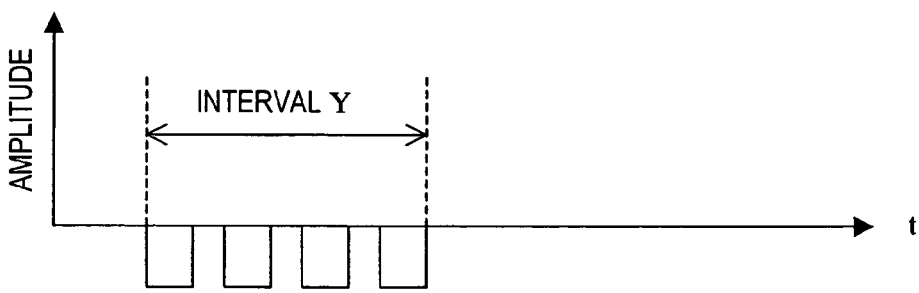
FIG. 16 shows an exemplary control signal to be applied in the interval Y.

FIG. 16 shows an exemplary control signal to be applied in the interval Y. The second shifter 108 or 202 may generate a control signal that decelerates the focus shifting intermittently in the interval Y. In that case, as the focal point of the light beam is getting closer to the target data storage layer, the focus shifting velocity can be decreased appropriately. As a result, the focusing part 110 (e.g., the convergent lens 126) is even less likely to contact with the optical disc 102 accidentally.

Figure 17:
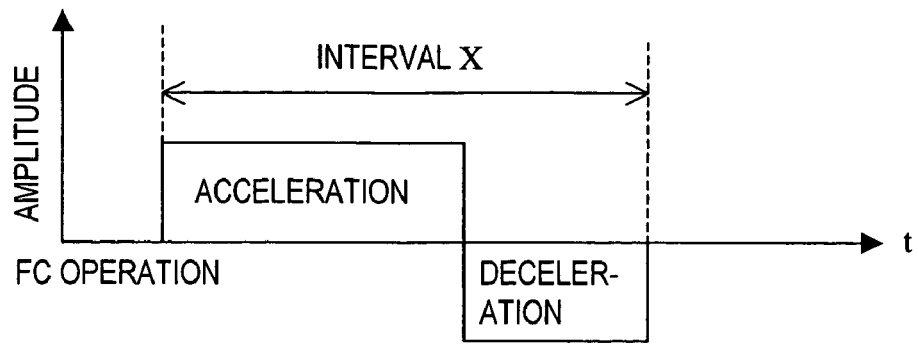
FIG. 17 shows an exemplary control signal to be applied in the interval X.
Figure 18:
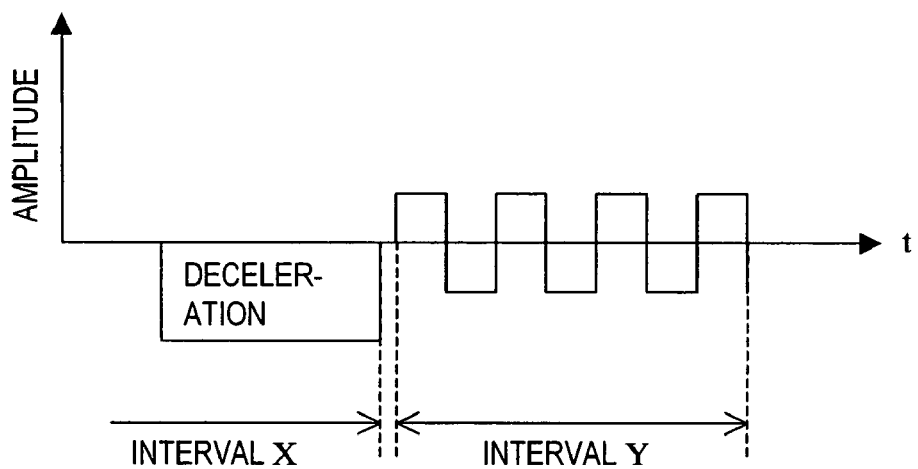
FIG. 18 shows exemplary control signals in which a time interval is provided between the intervals X and Y.
Figure 19:
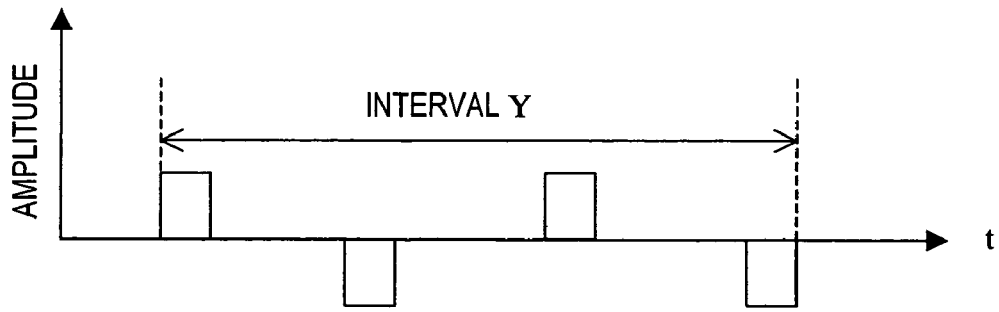
FIG. 19 shows an exemplary control signal for decelerating accelerated focus shifting and accelerating the decelerated focus shifting.

FIG. 17 shows an exemplary control signal to be applied in the interval X. As shown in FIG. 17, the first shifter 106 may control the focal point such that the focus shifting is decelerated immediately after having been accelerated in the interval X. Alternatively, as shown in FIG. 18, a time interval may be provided after the focal point has been controlled by the first shifter 106 and before the focal point starts being controlled by the second shifter 108 or 202. As another alternative, a relatively wide interval may be provided by the second shifter 108 or 202 between each pair of pulses in the interval Y as shown in FIG. 19. Furthermore, the second shifter 108 or 202 may also control the focal point such that the accelerated focus shifting is always decelerated next and that the decelerated focus shifting is always accelerated next. Optionally, the second shifter 108 or 202 may even output just one accelerating pulse and just one decelerating pulse instead of the pulse train.

Also, the first shifter 106 may stop applying the acceleration signal in the interval X in response to a detection signal such as the FE signal. Furthermore, the first shifter 106 may accelerate or decelerate the focus shifting a number of times in the same interval X. For example, the first shifter 106 may output multiple accelerating pulses or multiple decelerating pulses in the same interval X. In that case, the accelerating pulses may alternate with the decelerating pulses. Alternatively, the accelerating pulses may be applied intermittently and then the decelerating pulses may be applied intermittently.

Furthermore, the second shifter 108 or 202 may monitor the focus shifting velocity of the light beam. For example, in Step S128 shown in FIG. 8, the second shifter 108 or 202 may determine whether or not the focus shifting velocity has reached a predetermined velocity range. If the answer is YES, the procedure advances to the next step S130. Otherwise, the procedure returns to the previous step S126. Optionally, the control operations of various preferred embodiments of the present invention described above may be combined arbitrarily.

The DSP 162 preferably performs the focus jump operation by executing a computer program stored on a computer-readable storage medium (not shown) such as a ROM or a RAM. Such a computer program includes instructions that are defined so as to carry out the processing steps shown in the flowchart of FIG. 8 or 10. The computer program may be stored on any of various types of storage media. Examples of the storage media include optical storage media such as optical discs, semiconductor storage media such as an SD memory card or an EEPROM, and magnetic recording media such as a flexible disk. Alternatively, instead of using such a storage medium, the computer program may also be downloaded via a telecommunications line (e.g., through the Internet, for example) and installed in the optical disc drive 100.

Optionally, the DSP 162 may be sold as a separate product. In that case, the DSP 162 may be introduced into an apparatus including all of the components shown in FIG. 3 but the DSP 162 to make the apparatus function as the optical disc drive of the present invention.

An optical disc drive according to any of various preferred embodiments of the present invention described above can control the focal point of a light beam with high precision, and can perform a focus jump operation just as intended on any of multiple data storage layers of a given optical disc. In addition, the optical disc drive of the present invention can substantially prevent a focusing part such as a convergent lens from coming into contact with the optical disc accidentally. Thus, neither the convergent lens nor the optical disc gets scratched.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive comprising:
   a light source;
   a focusing section for focusing light emitted from the light source;
   a focus shifting section for shifting a focal point of the light by changing the position of the focusing section perpendicularly to a data storage layer of a given optical disc in accordance with a control signal which is a train of pulses;
   a light receiving section for receiving, at multiple areas, the light reflected from the data storage layer and generating light quantity signals representing quantities of the light received at the respective areas;
   a focus error signal generating section for generating a focus error signal based on the light quantity signals; and
   a control section for generating the control signal in response to the focus error signal such that the focal point of the light is transferred to a focus controllable range in which a focus control is able to be performed on the data storage layer,
   wherein the control section generates the control signal such that the focal point of the light being shifted toward the data storage layer is decelerated initially at a first acceleration and then at a second acceleration, the absolute value of the second acceleration being smaller than that of the first acceleration and the control signal for decelerating the focal point of the light at the second acceleration at least includes a first type of pulses that accelerate the focal point toward the focus controllable range and a second type of pulses that accelerate the focal point away from the focus controllable range,
   wherein the control section suspends controlling the focal point of the light after a first peak of the focus error signal is detected at the data storage layer, and
   wherein the control section further controls the focal point of the light to be shifted toward the data storage layer, in the case where an amplitude of the focus error passes a second peak at the data storage layer.

2. The optical disc drive according to claim 1, wherein the control section generates the control signal such that the focusing section is brought away from the optical disc and that the focal point stops shifting once entered the focus controllable range.

3. The optical disc drive according to claim 1, wherein the control section generates the control signal such that the focusing section is brought toward the optical disc until the focal point of the light passes the focus controllable range and then brought away from the optical disc once the focal point has passed the focus controllable range.

4. The optical disc drive according to claim 3, wherein the control section generates the control signal such that until the focal point of the light passes the focus controllable range, the focal point being shifted is decelerated at the first acceleration and then at the second acceleration, and that once the focal point has passed the focus controllable range, the focal point stops shifting.

5. The optical disc drive according to claim 1, wherein the control section generates the control signal such that the focal point of the light being shifted is decelerated at the first acceleration and then stops shifting once and that the focal point starts being shifted again in the same direction and then decelerated at the second acceleration.

6. The optical disc drive according to claim 2, wherein the optical disc has a plurality of data storage layers, and
   wherein the control section generates the control signal such that the focal point of the light being shifted from one of the plurality of data storage layers, for which the focus control is performed, toward the data storage layer.

7. The optical disc drive according to claim 1, wherein the control section generates the control signal, in which the first type of pulses alternate with the second type of pulses so that the focal point of the light is decelerated at the second acceleration.

8. The optical disc drive according to claim 7, wherein the focus shifting section changes the position, acceleration and velocity of the focusing section according to the numbers, magnitudes and durations of the first and second types of pulses applied, and
   wherein the control section generates the control signal by adjusting at least one of the numbers, magnitudes and durations of the first and second types of pulses applied.

9. The optical disc drive according to claim 1, wherein the control section suspends the focus control on the data storage layer while generating the control signal.

10. The optical disc drive according to claim 9, wherein the control section starts the focus control after having transferred the focal point to the focus controllable range.

11. A method for getting the focal point of light transferred to a focus controllable range by an optical disc drive, the optical disc drive comprising: a light source; a focusing section for focusing the light emitted from the light source; a focus shifting section for shifting a focal point of the light by changing the position of the focusing section perpendicularly to a data storage layer of a given optical disc in accordance with a control signal which is a train of pulses; a light receiving section for receiving, at multiple areas, the light reflected from the data storage layer and generating light quantity signals representing quantities of the light received at the respective areas; and a focus error signal generating section for generating a focus error signal based on the light quantity signals, wherein the method comprises the steps of:
(a) generating a first control signal in response to the focus error signal and supplying the first control signal to the focus shifting section such that the focal point of the light being shifted toward the data storage layer is decelerated at a first acceleration; and
(b) generating a second control signal and supplying the second control signal to the focus shifting section after the step (a) such that the focal point of the light is decelerated at a second acceleration and that the absolute value of the second acceleration is smaller than that of the first acceleration and the control signal for decelerating the focal point of the light at the second acceleration at least includes a first type of pulses that accelerate the focal point toward the focus controllable range and a second type of pulses that accelerate the focal point away from the focus controllable range, and
wherein the second control signal is not supplied to the focus shifting section after a first peak of the focus error signal is detected at the data storage layer, and
wherein the second control signal is supplied to the focus shifting section to shift the focal point of the light toward the data storage layer after a second peak is detected at the data storage layer,
wherein the control section further controls the focal point of the light to be shifted in an opposite direction, in the case where an amplitude of the focus error signal crosses a zero level after having reached a second peak at the data storage layer.

12. A processor for use in an optical disc drive, the optical disc drive comprising: a light source; a focusing section for focusing light emitted from the light source; a focus shifting section for shifting a focal point of the light by changing the position of the focusing section perpendicularly to a data storage layer of a given optical disc in accordance with a control signal which is a train of pulses; a light receiving section for receiving, at multiple areas, the light reflected from the data storage layer and generating light quantity signals representing quantities of the light received at the respective areas; and a focus error signal generating section for generating a focus error signal based on the light quantity signals,
wherein the processor includes:
a first shifting control section for generating a first control signal in response to the focus error signal and supplying the first control signal to the focus shifting section such that the focal point of the light being shifted toward the data storage layer is decelerated at a first acceleration; and
a second shifting control section for generating a second control signal and supplying the second control signal to the focus shifting section such that the focal point of the light is decelerated at a second acceleration and that the absolute value of the second acceleration is smaller than that of the first acceleration and the control signal for decelerating the focal point of the light at the second acceleration at least includes a first type of pulses that accelerate the focal point toward the focus controllable range and a second type of pulses that accelerate the focal point away from the focus controllable range, and
wherein supplying the second control signal to the focus shifting section is suspended after a first peak of the focus error signal is detected at the data storage layer, and
wherein the second control signal is further supplied to the focus shifting section to shift the focal point of the light toward the data storage layer after a second peak is detected at the data storage layer.

13. A computer readable storage medium having a computer executable program stored thereon, the program is executed by an optical disc drive for focus control to perform the steps of:
(a) generating a first control signal in response to a focus error signal and supplying the first control signal to a focus shifting section such that a focal point of a light being shifted toward a data storage layer is decelerated at a first acceleration; and
(b) generating a second control signal and supplying the second control signal to the focus shifting section such that the focal point of the light is decelerated at a second acceleration and that the absolute value of the second acceleration is smaller than that of the first acceleration and a control signal for decelerating the focal point of the light at the second acceleration at least includes a first type of pulses that accelerate the focal point toward a focus controllable range and a second type of pulses that accelerate the focal point away from the focus controllable range,
wherein supplying the second control signal to the focus shifting section is suspended after a first peak of the focus error signal is detected at the data storage layer, and
wherein the second control signal is further supplied to the focus shifting section to shift the focal point of the light toward the data storage layer after a second peak is detected at the data storage layer.

* * * * *